(12) United States Patent
Murata

(10) Patent No.: US 8,656,008 B2
(45) Date of Patent: Feb. 18, 2014

(54) NETWORK MONITORING CONTROL DEVICE AND MONITORING CONTROL METHOD

(75) Inventor: Masao Murata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 205 days.

(21) Appl. No.: 12/748,934

(22) Filed: Mar. 29, 2010

(65) Prior Publication Data
US 2010/0250739 A1    Sep. 30, 2010

(30) Foreign Application Priority Data

Mar. 30, 2009  (JP) .................................. 2009-83619

(51) Int. Cl.
| | |
|---|---|
| G06F 15/173 | (2006.01) |
| G06F 15/167 | (2006.01) |
| G06F 15/16 | (2006.01) |
| H04L 12/26 | (2006.01) |
| H04B 1/56 | (2006.01) |

(52) U.S. Cl.
USPC ............ 709/224; 709/217; 709/225; 709/226; 709/228; 709/238; 370/229; 370/252; 370/468

(58) Field of Classification Search
USPC .......... 709/217, 224–226, 228, 238; 370/229, 370/252, 468
See application file for complete search history.

(56) References Cited

U.S. PATENT DOCUMENTS

| | | | | |
|---|---|---|---|---|
| 6,097,722 | A * | 8/2000 | Graham et al. .......... | 370/395.21 |
| 6,249,060 | B1 * | 6/2001 | Osha ............................ | 307/10.1 |
| 6,282,169 | B1 * | 8/2001 | Kiremidjian ................... | 370/220 |
| 6,765,868 | B1 * | 7/2004 | Dunn et al. .................... | 370/230 |
| 6,967,925 | B2 * | 11/2005 | Sato ............................... | 370/235 |
| 7,050,184 | B1 * | 5/2006 | Miyamoto .................... | 358/1.15 |
| 2001/0040904 | A1 * | 11/2001 | Sato ............................... | 370/537 |
| 2004/0081093 | A1 * | 4/2004 | Haddock et al. .............. | 370/230 |
| 2004/0085959 | A1 * | 5/2004 | Ohkawa ........................ | 370/389 |
| 2006/0176808 | A1 * | 8/2006 | Isobe et al. .................... | 370/229 |
| 2006/0282785 | A1 * | 12/2006 | McCarthy et al. ............ | 715/760 |
| 2010/0165881 | A1 * | 7/2010 | Hof et al. ....................... | 370/254 |

FOREIGN PATENT DOCUMENTS

| | | |
|---|---|---|
| JP | 11-136238 | 5/1999 |
| JP | 2000-115233 | 4/2000 |
| WO | WO 2005/117368 A1 | 12/2005 |

OTHER PUBLICATIONS

Japanese Notification of Reasons for Refusal mailed Nov. 27, 2012 issued in corresponding Japanese Patent Application No. 2009-083619.

* cited by examiner

*Primary Examiner* — David Lazaro
*Assistant Examiner* — Farzana Huq
(74) *Attorney, Agent, or Firm* — Staas & Halsey LLP

(57) ABSTRACT

A monitoring control device monitors a communication device connected through a network through a virtual LAN provided on the network. The monitoring control device includes: a bandwidth learning unit which learns a bandwidth between the communication device and the monitoring control device by a first file transfer; and a file transfer management unit which manages whether or not a second file transfer, which passes through at least one section, is able to be performed based on a section bandwidth of the at least one section of the network, the section bandwidth obtained from the bandwidth learned by the bandwidth learning unit.

10 Claims, 44 Drawing Sheets

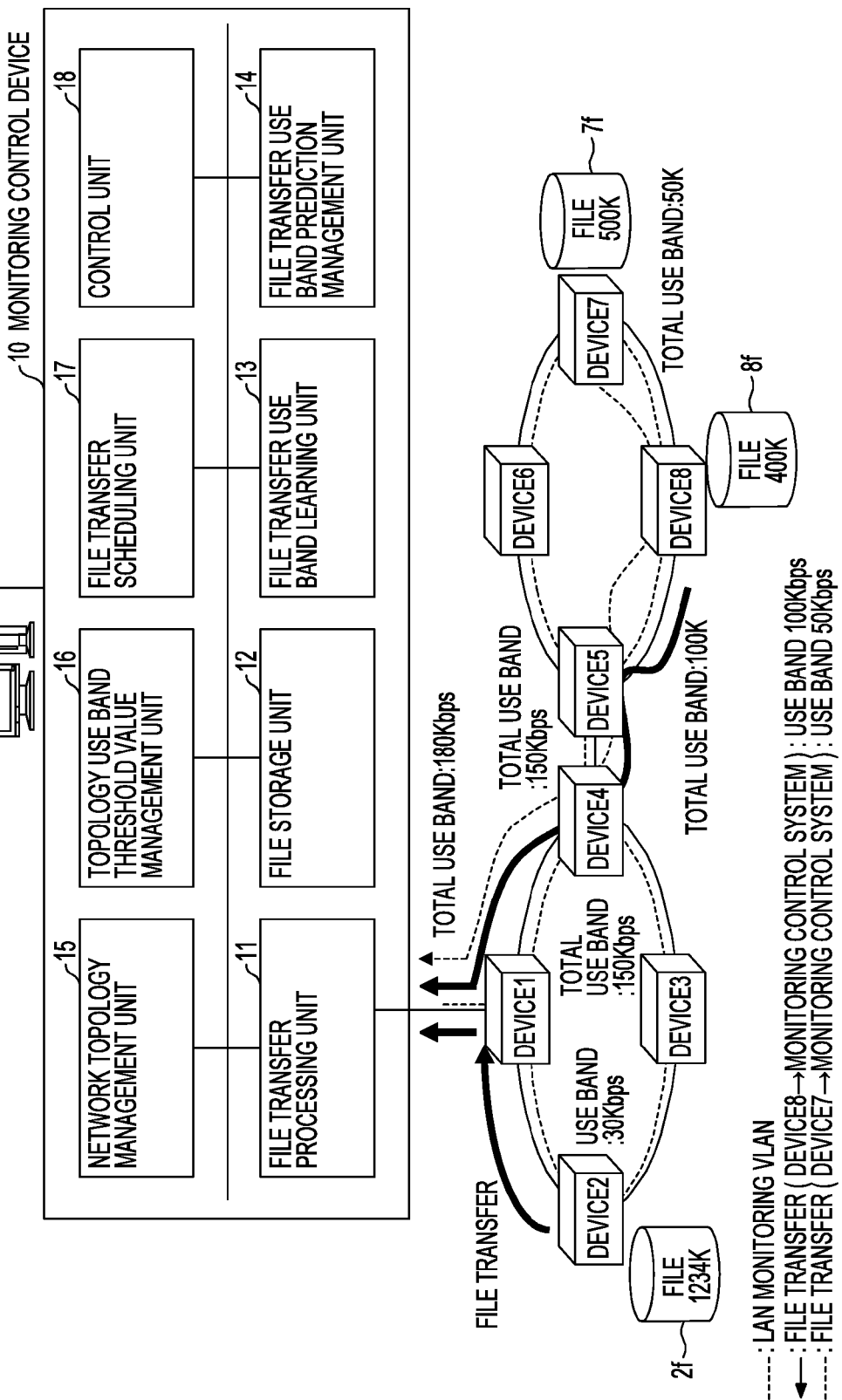

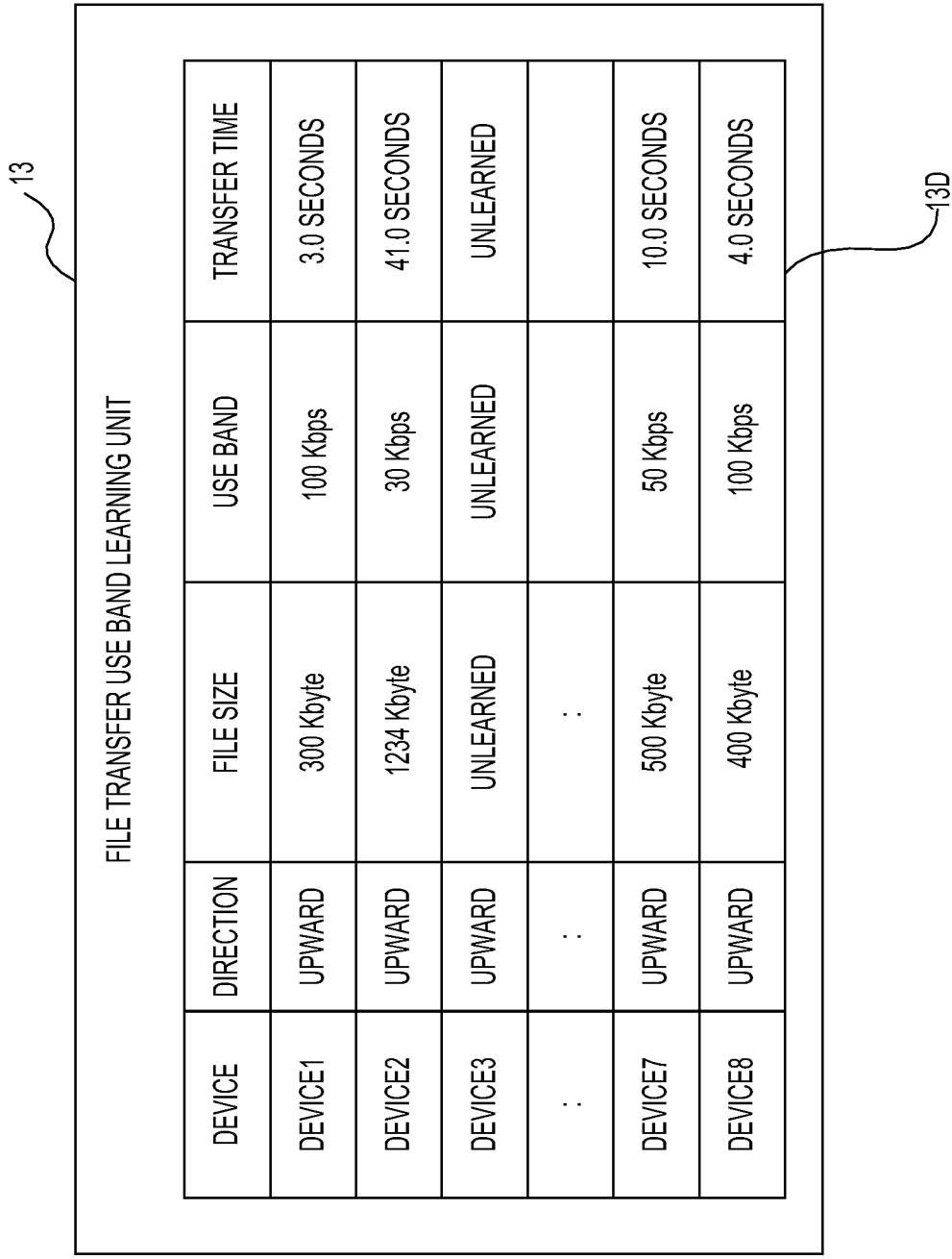

FILE TRANSFER USE BAND PREDICTION MANAGEMENT UNIT

| SECTION | DIRECTION | USE BAND | PREDICTED END DATE |
|---|---|---|---|
| OpS – DEVICE 1 | UPWARD | 180 Kbps | 8/13 12:00 |
| DEVICE 1 – DEVICE 2 | UPWARD | 30 Kbps | 8/13 12:00 |
| DEVICE 1 – DEVICE 4 | UPWARD | 150 Kbps | 8/13 12:00 |
| .. | .. | | |
| DEVICE 4 – DEVICE 5 | UPWARD | 150 Kbps | 8/13 12:00 |
| DEVICE 5 – DEVICE 8 | UPWARD | 150 Kbps | 8/13 12:00 |
| DEVICE 8 – DEVICE 7 | UPWARD | 50 Kbps | 8/13 12:02 |

FIG.1E

TOPOLOGY USE BAND THRESHOLD VALUE MANAGEMENT UNIT (16)

| SECTION | DIRECTION | SET THRESHOLD VALUE |
|---|---|---|
| OpS – DEVICE 1 | UPWARD | 1000 Kbps |
| DEVICE 1 – DEVICE 2 | UPWARD | 300 Kbps |
| DEVICE 1 – DEVICE 4 | UPWARD | 500 Kbps |
| .. | .. | |
| DEVICE 4 – DEVICE 5 | UPWARD | 500 Kbps |
| DEVICE 5 – DEVICE 8 | UPWARD | 500 Kbps |
| DEVICE 8 – DEVICE 7 | UPWARD | 500 Kbps |

FILE TRANSFER SCHEDULING UNIT ~17

| DEVICE | DIRECTION | FILE SIZE | SCHEDULED START DATE | PREDICTED END DATE |
|---|---|---|---|---|
| DEVICE 8 | UPWARD | 400 Kbyte | 9/1 0:00 | 9/1 0:01 |
| DEVICE 7 | UPWARD | 500 Kbyte | 9/1 0:01 | 9/1 0:02 |
| .. | .. | .. | .. | .. |

| SECTION | DIRECTION | USE BAND | SCHEDULED START DATE | PREDICTED END DATE |
|---|---|---|---|---|
| OpS – DEVICE 1 | UPWARD | 400 Kbyte | 9/1 0:00 | 9/1 0:03 |
| DEVICE 1 – DEVICE 4 | UPWARD | 400 Kbyte | 9/1 0:00 | 9/1 0:03 |
| DEVICE 4 – DEVICE 5 | UPWARD | 400 Kbyte | 9/1 0:00 | 9/1 0:03 |
| DEVICE 5 – DEVICE 8 | UPWARD | 400 Kbyte | 9/1 0:00 | 9/1 0:03 |

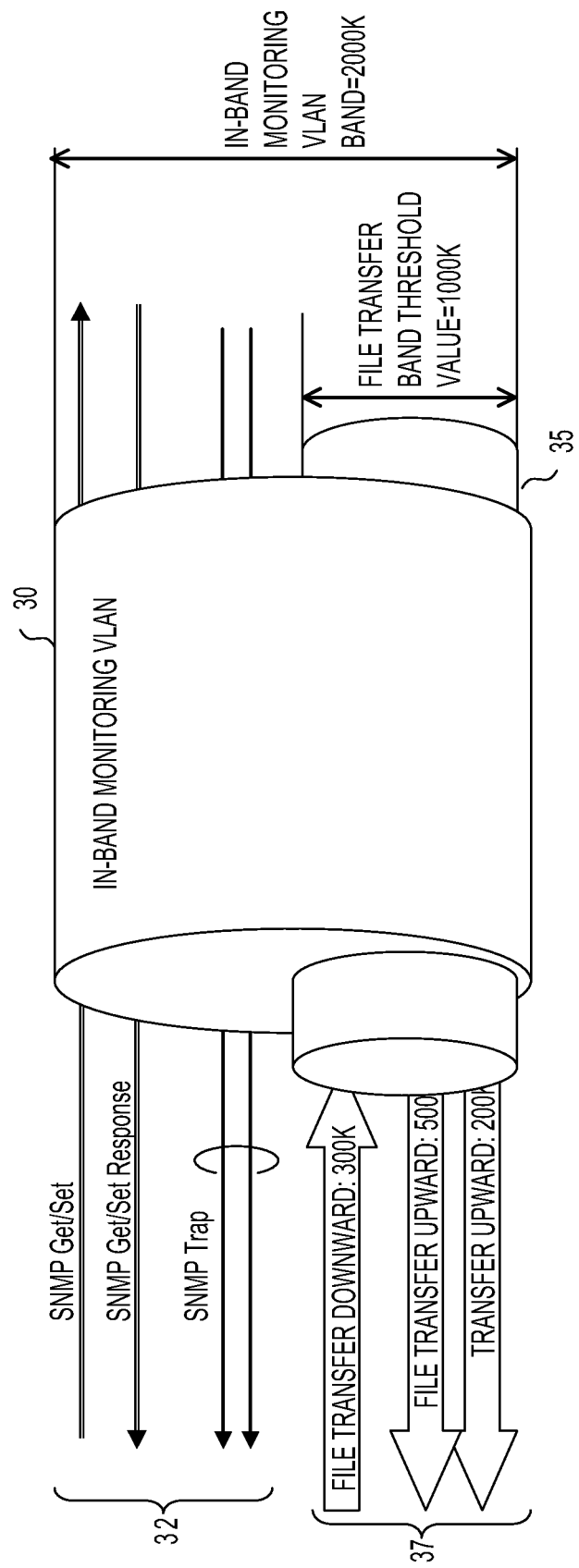

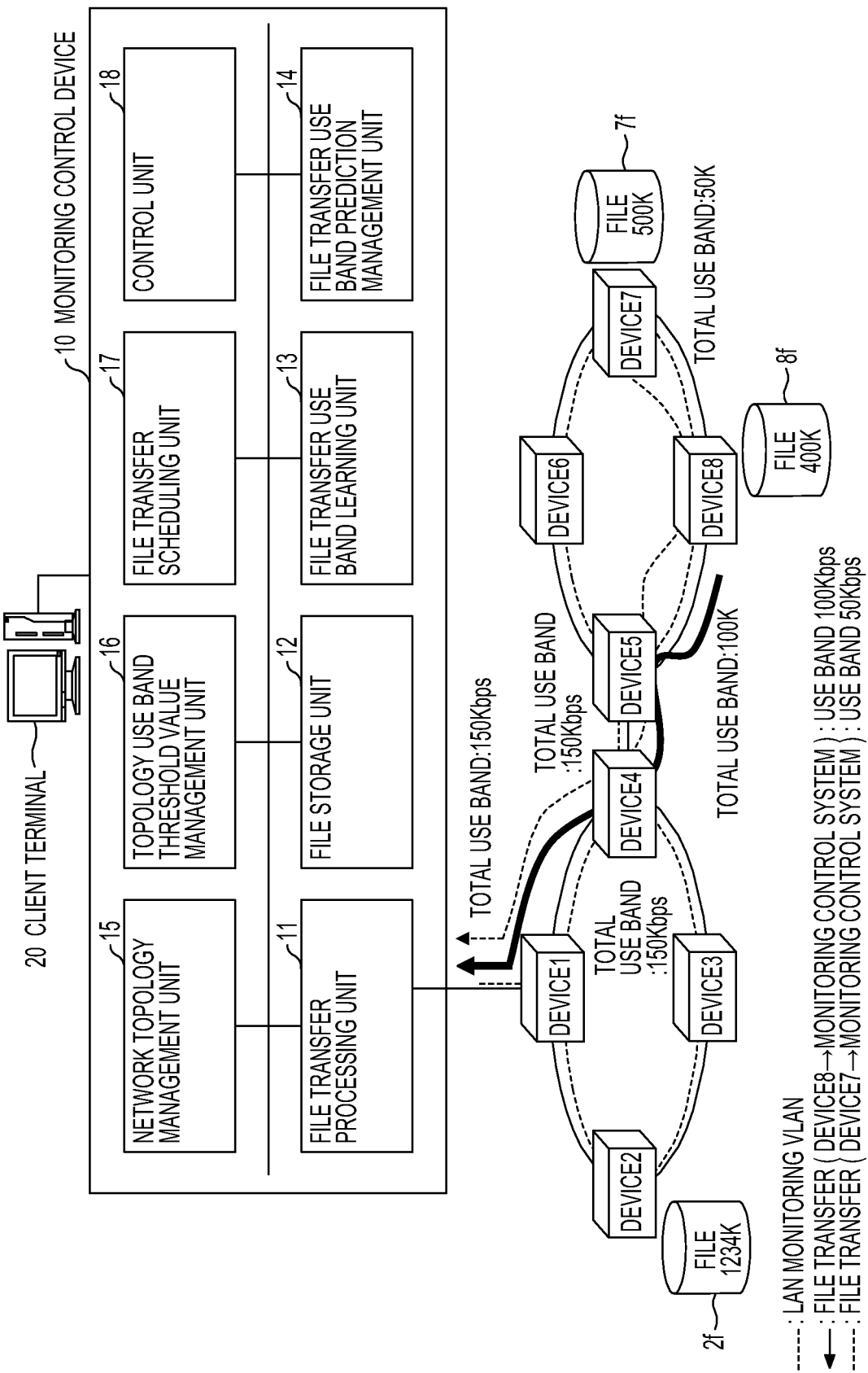

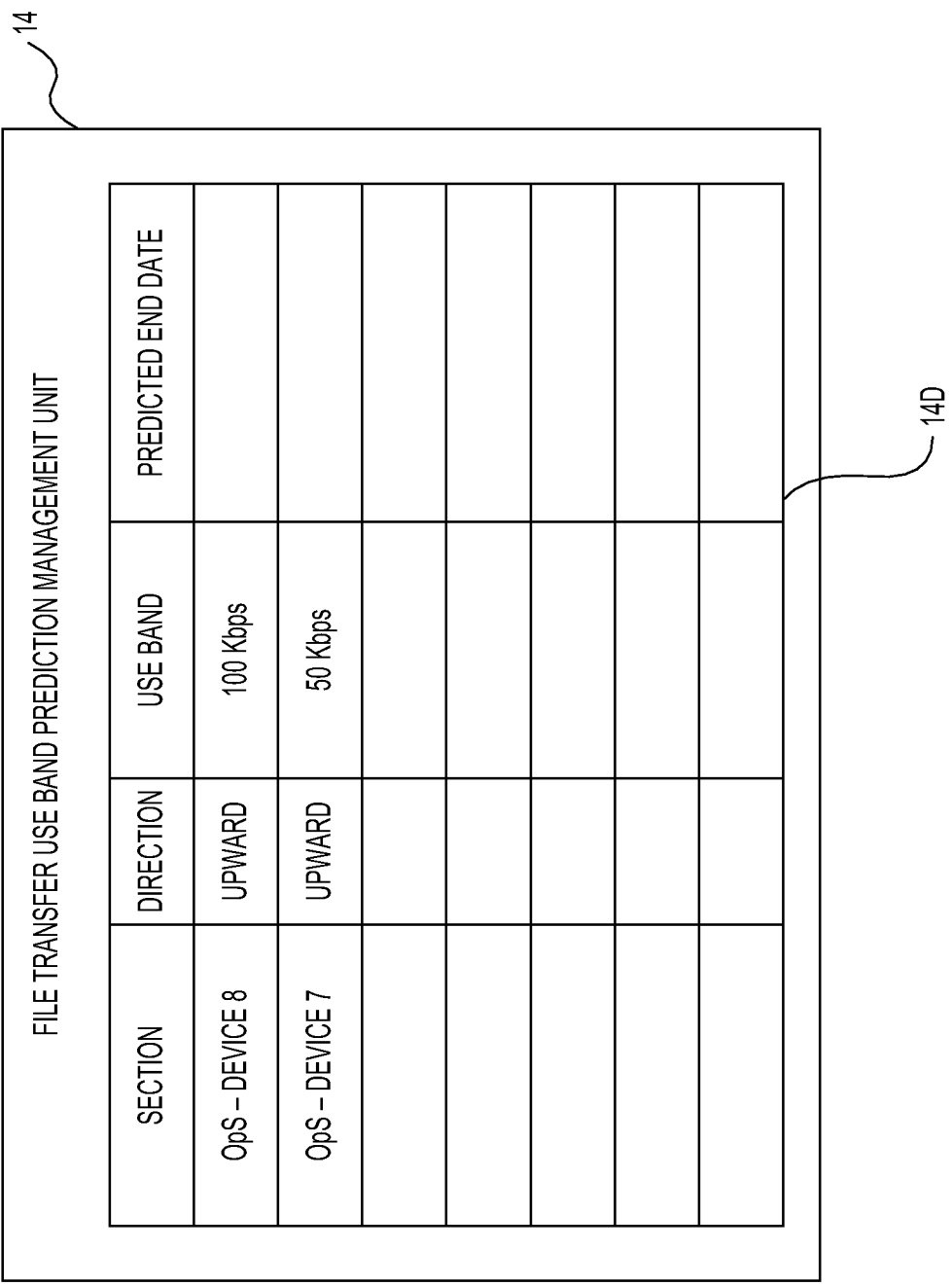

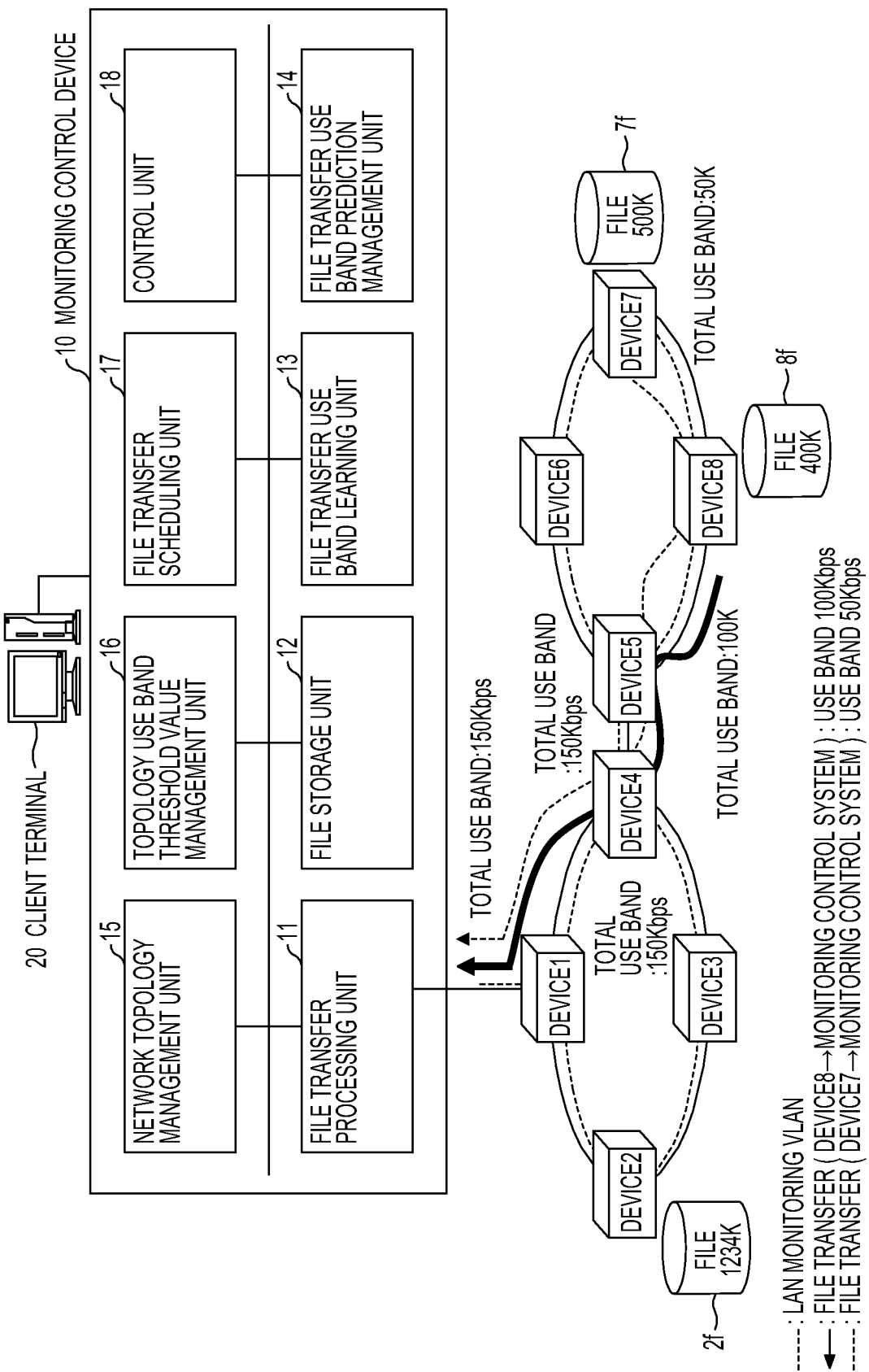

FILE TRANSFER USE BAND LEARNING UNIT

| DEVICE | DIRECTION | FILE SIZE | USE BAND | TRANSFER TIME |
|---|---|---|---|---|
| DEVICE1 | UPWARD | 300 Kbyte | 100 Kbps | 3.0 SECONDS |
| DEVICE2 | UPWARD | 1234 Kbyte | 30 Kbps | 41.0 SECONDS |
| DEVICE3 | UPWARD | UNLEARNED | UNLEARNED | UNLEARNED |
| .. | .. | .. | | |
| DEVICE7 | UPWARD | 500 Kbyte | 50 Kbps | 10.0 SECONDS |
| DEVICE8 | UPWARD | 400 Kbyte | 100 Kbps | 4.0 SECONDS |

FIG.5C

FILE TRANSFER USE BAND PREDICTION MANAGEMENT UNIT (14)

| SECTION | DIRECTION | USE BAND | PREDICTED END DATE |
|---|---|---|---|
| OpS – DEVICE 1 | UPWARD | 150 Kbps | |
| DEVICE 1 – DEVICE 2 | UPWARD | 0 Kbps | |
| DEVICE 1 – DEVICE 4 | UPWARD | 150 Kbps | |
| . . | . . | | |
| DEVICE 4 – DEVICE 5 | UPWARD | 150 Kbps | |
| DEVICE 5 – DEVICE 8 | UPWARD | 150 Kbps | |
| DEVICE 8 – DEVICE 7 | UPWARD | 50 Kbps | |

(14D)

FILE TRANSFER USE BAND LEARNING UNIT — 13

| DEVICE | DIRECTION | FILE SIZE | USE BAND | TRANSFER TIME |
|---|---|---|---|---|
| DEVICE1 | UPWARD | 300 Kbyte | 100 Kbps | 3.0 SECONDS |
| DEVICE2 | UPWARD | 1234 Kbyte | 30 Kbps | 41.0 SECONDS |
| DEVICE3 | UPWARD | UNLEARNED | UNLEARNED | UNLEARNED |
| .. | .. | .. | | |
| DEVICE7 | UPWARD | 500 Kbyte | 50 Kbps | 10.0 SECONDS |
| DEVICE8 | UPWARD | 400 Kbyte | 100 Kbps | 4.0 SECONDS |

FILE TRANSFER USE BAND PREDICTION MANAGEMENT UNIT — 14

| SECTION | DIRECTION | USE BAND | PREDICTED END DATE |
|---|---|---|---|
| OpS – DEVICE 1 | UPWARD | 180 Kbps | 8/13 12:00 |
| DEVICE 1 – DEVICE 2 | UPWARD | 30 Kbps | 8/13 12:00 |
| DEVICE 1 – DEVICE 4 | UPWARD | 150 Kbps | 8/13 12:00 |
| ‥ | ‥ | | |
| DEVICE 4 – DEVICE 5 | UPWARD | 150 Kbps | 8/13 12:00 |
| DEVICE 5 – DEVICE 8 | UPWARD | 150 Kbps | 8/13 12:00 |
| DEVICE 8 – DEVICE 7 | UPWARD | 50 Kbps | 8/13 12:02 |

TOPOLOGY USE BAND THRESHOLD VALUE MANAGEMENT UNIT — 16

| SECTION | DIRECTION | SET THRESHOLD VALUE |
|---|---|---|
| OpS – DEVICE 1 | UPWARD | 1000 Kbps |
| DEVICE 1 – DEVICE 2 | UPWARD | 300 Kbps |
| DEVICE 1 – DEVICE 4 | UPWARD | 500 Kbps |
| . . | . . | |
| DEVICE 4 – DEVICE 5 | UPWARD | 500 Kbps |
| DEVICE 5 – DEVICE 8 | UPWARD | 500 Kbps |
| DEVICE 8 – DEVICE 7 | UPWARD | 500 Kbps |

FILE TRANSFER SCHEDULING UNIT

| DEVICE | DIRECTION | FILE SIZE | SCHEDULED START DATE | PREDICTED END DATE |
|---|---|---|---|---|
| | | | | |
| | | | | |
| | | | | |

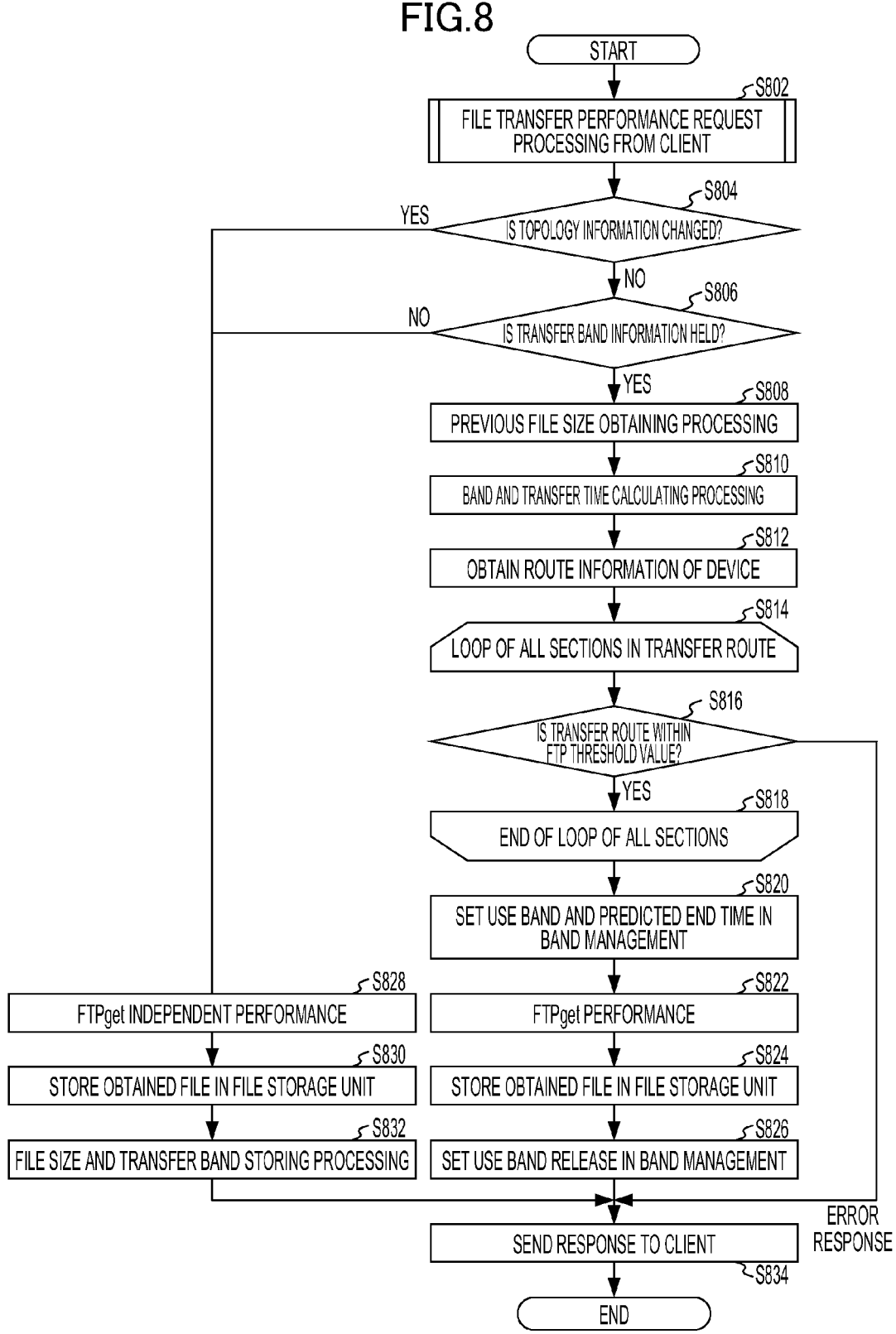

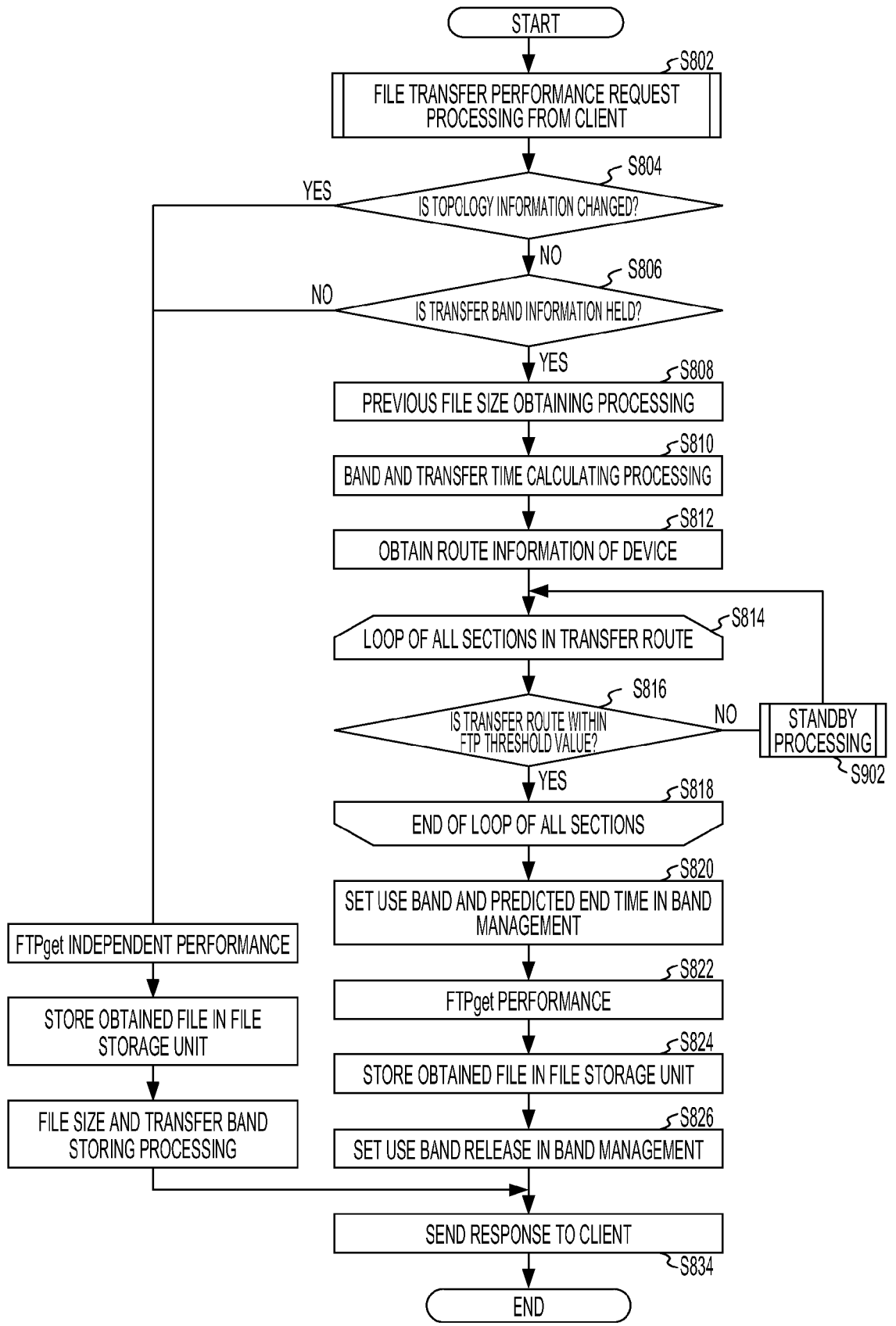

FIG.10B

FILE TRANSFER USE BAND LEARNING UNIT — 13

| DEVICE | DIRECTION | FILE SIZE | USE BAND | TRANSFER TIME |
|---|---|---|---|---|
| DEVICE1 | UPWARD | 300 Kbyte | 100 Kbps | 3.0 SECONDS |
| DEVICE2 | UPWARD | 1234 Kbyte | 30 Kbps | 41.0 SECONDS |
| DEVICE3 | UPWARD | UNLEARNED | UNLEARNED | UNLEARNED |
| .. | .. | .. | | |
| DEVICE7 | UPWARD | 500 Kbyte | 50 Kbps | 10.0 SECONDS |
| DEVICE8 | UPWARD | 400 Kbyte | 100 Kbps | 4.0 SECONDS |

FILE TRANSFER USE BAND PREDICTION MANAGEMENT UNIT

| SECTION | DIRECTION | USE BAND | PREDICTED END DATE |
|---|---|---|---|
| OpS – DEVICE 1 | UPWARD | 150 Kbps | |
| DEVICE 1 – DEVICE 2 | UPWARD | 0 Kbps | |
| DEVICE 1 – DEVICE 4 | UPWARD | 150 Kbps | |
| .. | .. | | |
| DEVICE 4 – DEVICE 5 | UPWARD | 150 Kbps | |
| DEVICE 5 – DEVICE 8 | UPWARD | 150 Kbps | |
| DEVICE 8 – DEVICE 7 | UPWARD | 50 Kbps | |

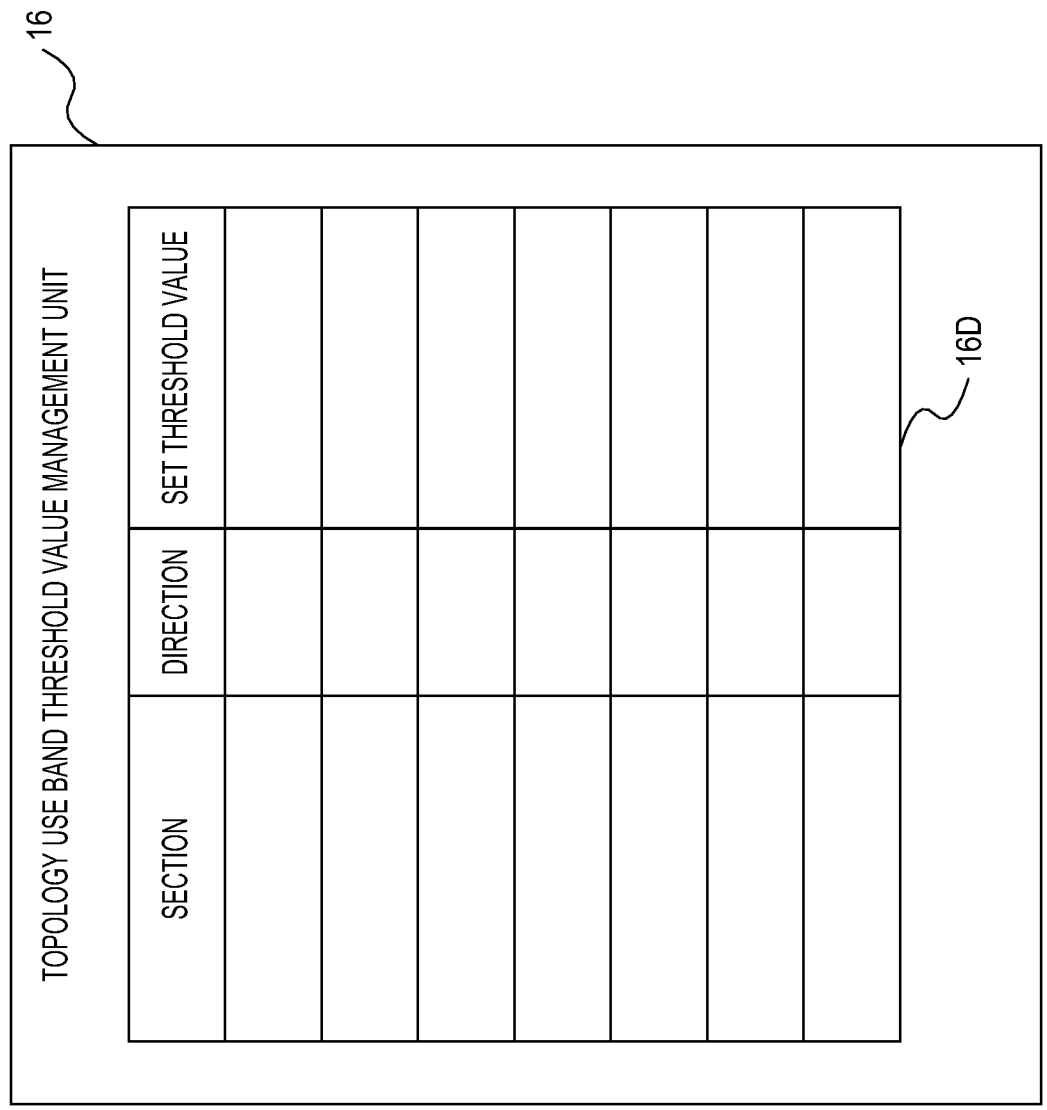

FIG.10F

FILE TRANSFER SCHEDULING UNIT 17

| DEVICE | DIRECTION | FILE SIZE | SCHEDULED START DATE | PREDICTED END DATE |
|--------|-----------|-----------|----------------------|--------------------|
|        |           |           |                      |                    |
|        |           |           |                      |                    |

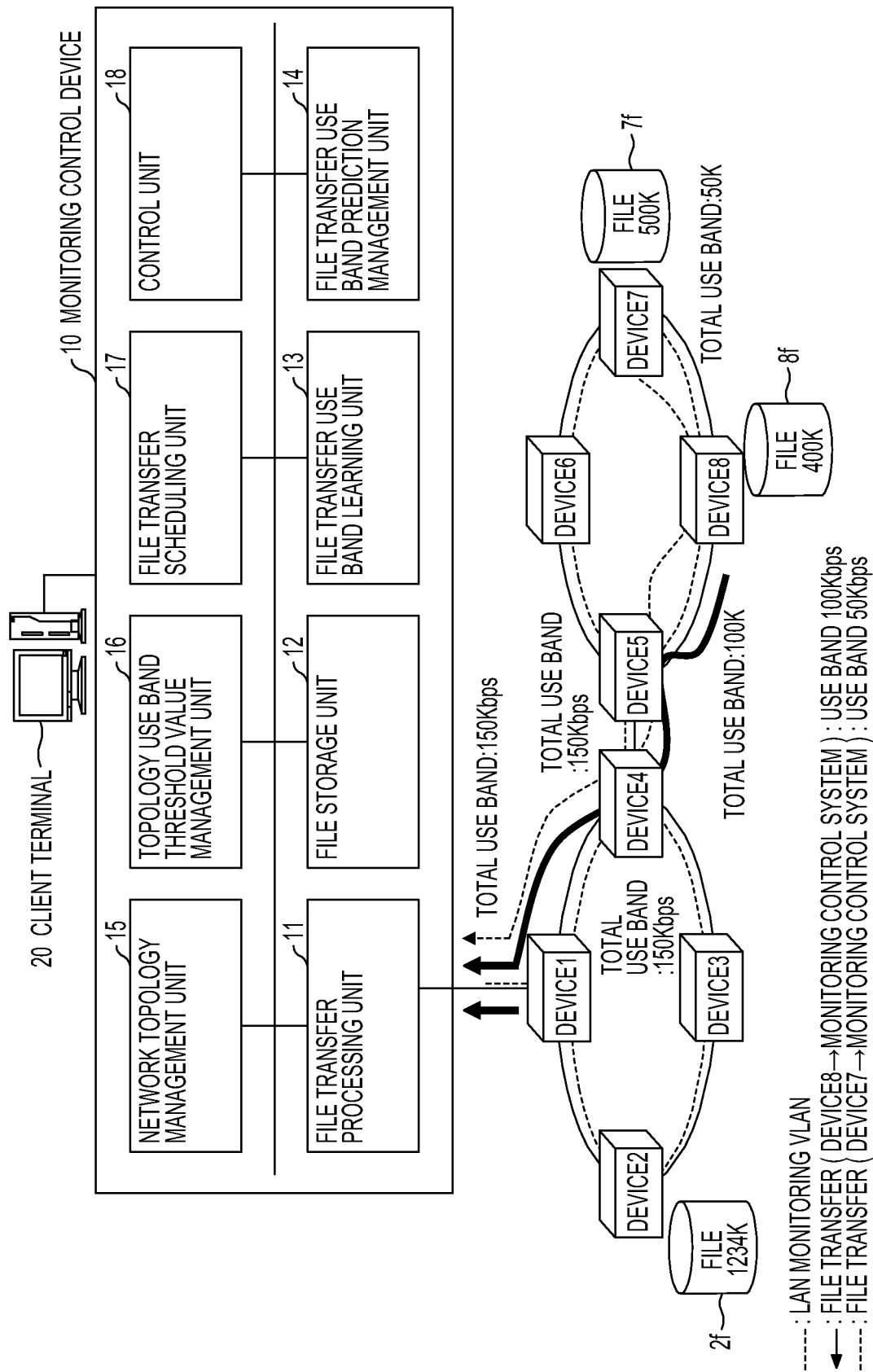

FIG.11B

FILE TRANSFER USE BAND LEARNING UNIT — 13

| DEVICE | DIRECTION | FILE SIZE | USE BAND | TRANSFER TIME |
|---|---|---|---|---|
| DEVICE1 | UPWARD | 300 Kbyte | 100 Kbps | 3.0 SECONDS |
| DEVICE2 | UPWARD | 1234 Kbyte | 30 Kbps | 41.0 SECONDS |
| DEVICE3 | UPWARD | UNLEARNED | UNLEARNED | UNLEARNED |
| .. | .. | .. | | |
| DEVICE7 | UPWARD | 500 Kbyte | 50 Kbps | 10.0 SECONDS |
| DEVICE8 | UPWARD | 400 Kbyte | 100 Kbps | 4.0 SECONDS |

FILE TRANSFER USE BAND PREDICTION MANAGEMENT UNIT — 14

| SECTION | DIRECTION | USE BAND | PREDICTED END DATE |
|---|---|---|---|
| OpS – DEVICE 1 | UPWARD | 150 Kbps | 8/13 12:00 |
| DEVICE 1 – DEVICE 2 | UPWARD | 0 Kbps | 8/13 12:00 |
| DEVICE 1 – DEVICE 4 | UPWARD | 150 Kbps | 8/13 12:00 |
| .. | .. | | |
| DEVICE 4 – DEVICE 5 | UPWARD | 150 Kbps | 8/13 12:00 |
| DEVICE 5 – DEVICE 8 | UPWARD | 150 Kbps | 8/13 12:00 |
| DEVICE 8 – DEVICE 7 | UPWARD | 50 Kbps | 8/13 12:02 |

14D

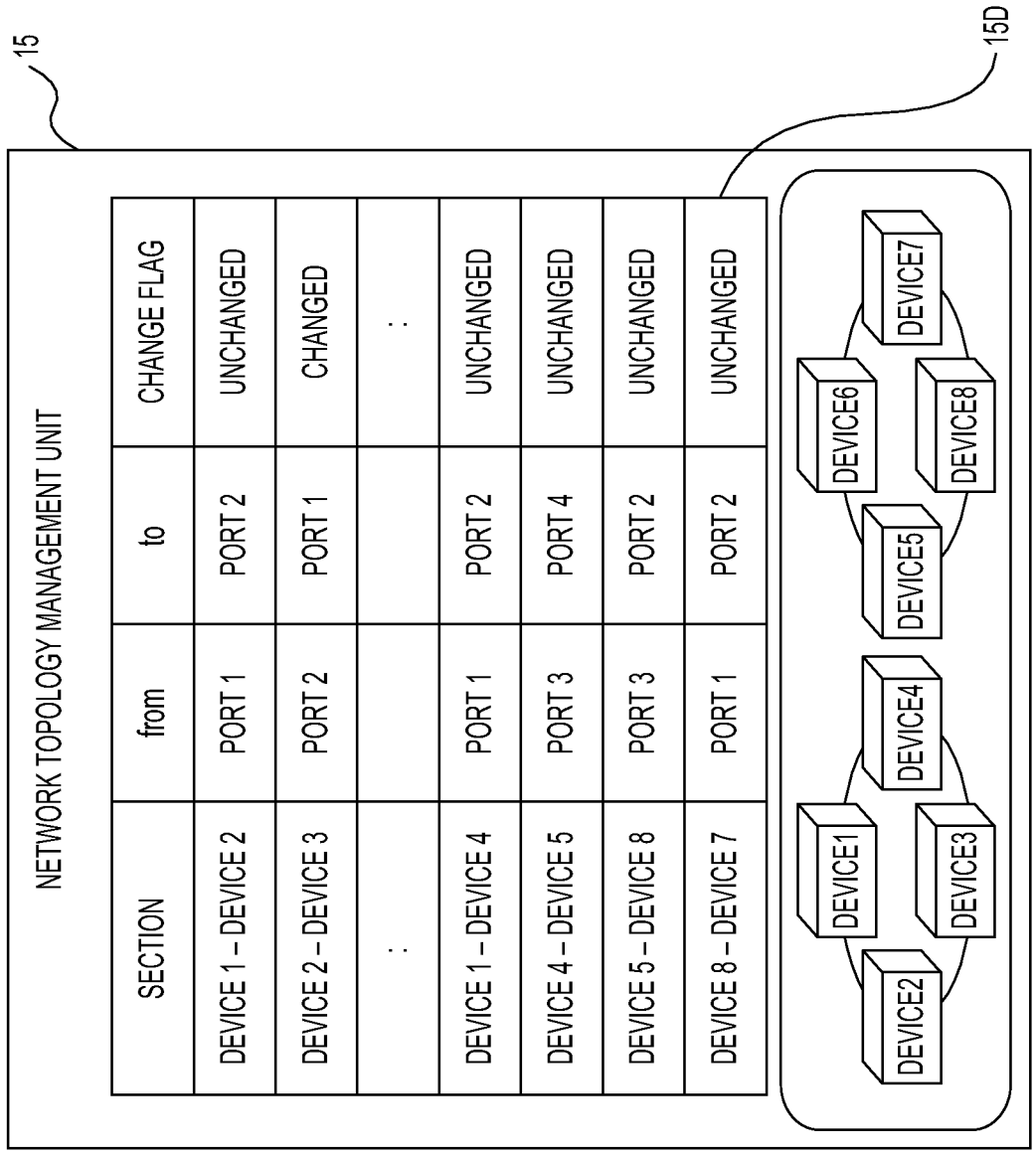

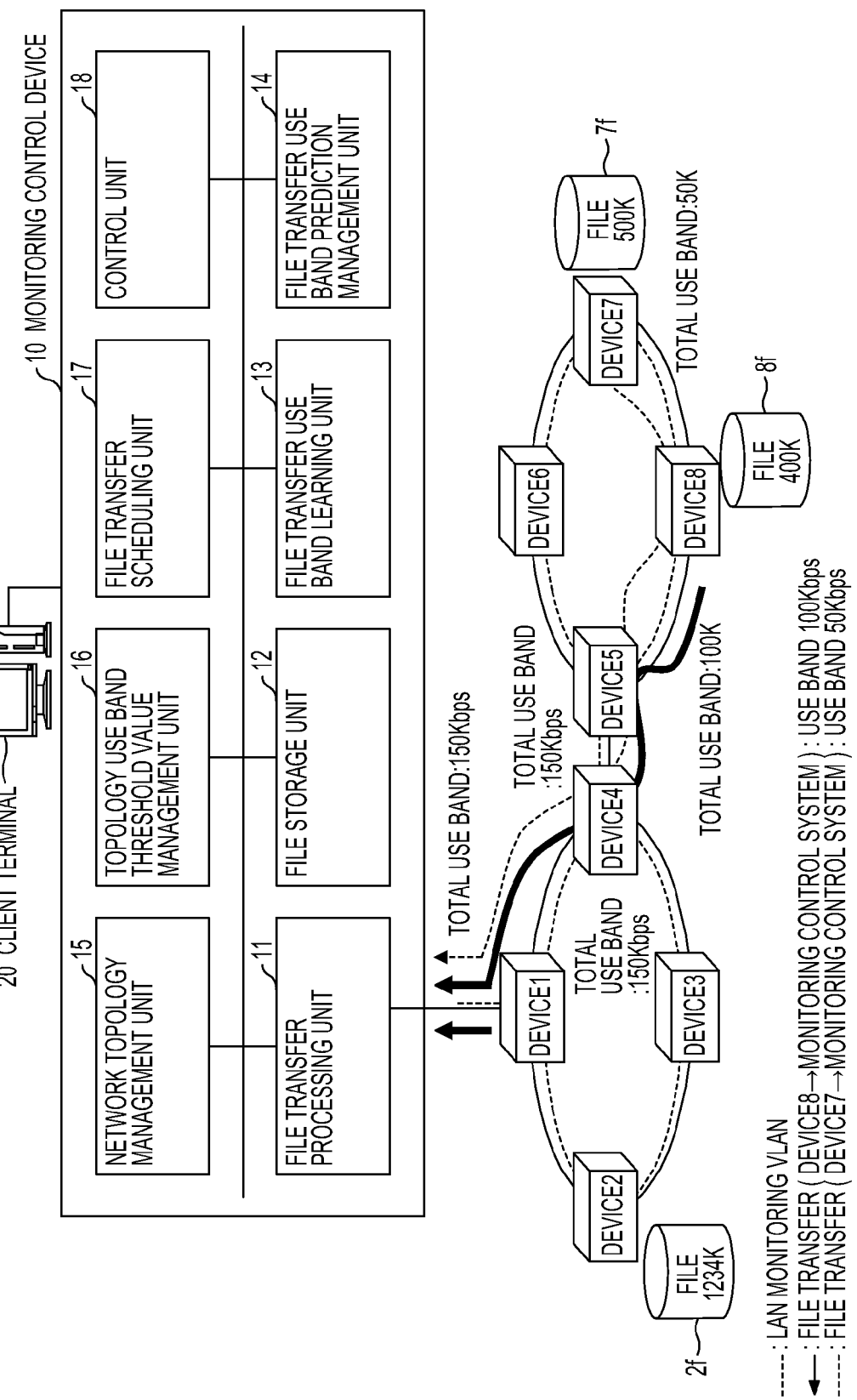

FIG.13B

FILE TRANSFER USE BAND LEARNING UNIT ~13

| DEVICE | DIRECTION | FILE SIZE | USE BAND | TRANSFER TIME |
|---|---|---|---|---|
| DEVICE1 | UPWARD | 300 Kbyte | 100 Kbps | 3.0 SECONDS |
| DEVICE2 | UPWARD | 1234 Kbyte | 30 Kbps | 41.0 SECONDS |
| DEVICE3 | UPWARD | UNLEARNED | UNLEARNED | UNLEARNED |
| .. | .. | .. | | |
| DEVICE7 | UPWARD | 500 Kbyte | 50 Kbps | 10.0 SECONDS |
| DEVICE8 | UPWARD | 400 Kbyte | 100 Kbps | 4.0 SECONDS |

FILE TRANSFER USE BAND PREDICTION MANAGEMENT UNIT (14)

| SECTION | DIRECTION | USE BAND | PREDICTED END DATE |
|---|---|---|---|
| OpS – DEVICE 1 | UPWARD | 180 Kbps | 8/13 12:00 |
| DEVICE 1 – DEVICE 2 | UPWARD | 30 Kbps | 8/13 12:00 |
| DEVICE 1 – DEVICE 4 | UPWARD | 150 Kbps | 8/13 12:00 |
| .. | .. | | |
| DEVICE 4 – DEVICE 5 | UPWARD | 150 Kbps | 8/13 12:00 |
| DEVICE 5 – DEVICE 8 | UPWARD | 150 Kbps | 8/13 12:00 |
| DEVICE 8 – DEVICE 7 | UPWARD | 50 Kbps | 8/13 12:02 |

TOPOLOGY USE BAND THRESHOLD VALUE MANAGEMENT UNIT — 16

| SECTION | DIRECTION | SET THRESHOLD VALUE |
|---|---|---|
| OpS – DEVICE 1 | UPWARD | 1000 Kbps |
| DEVICE 1 – DEVICE 2 | UPWARD | 300 Kbps |
| DEVICE 1 – DEVICE 4 | UPWARD | 500 Kbps |
| .. | .. | |
| DEVICE 4 – DEVICE 5 | UPWARD | 500 Kbps |
| DEVICE 5 – DEVICE 8 | UPWARD | 500 Kbps |
| DEVICE 8 – DEVICE 7 | UPWARD | 500 Kbps |

FILE TRANSFER SCHEDULING UNIT ~17

| DEVICE | DIRECTION | FILE SIZE | SCHEDULED START DATE | PREDICTED END DATE |
|---|---|---|---|---|
| DEVICE 8 | UPWARD | 400 Kbyte | 9/1 0:00 | 9/1 0:01 |
| DEVICE 7 | UPWARD | 500 Kbyte | 9/1 0:01 | 9/1 0:02 |
| .. | .. | .. | .. | .. |

| SECTION | DIRECTION | USE BAND | SCHEDULED START DATE | PREDICTED END DATE |
|---|---|---|---|---|
| OpS – DEVICE 1 | UPWARD | 400 Kbyte | 9/1 0:00 | 9/1 0:03 |
| DEVICE 1 – DEVICE 4 | UPWARD | 400 Kbyte | 9/1 0:00 | 9/1 0:03 |
| DEVICE 4 – DEVICE 5 | UPWARD | 400 Kbyte | 9/1 0:00 | 9/1 0:03 |
| DEVICE 5 – DEVICE 8 | UPWARD | 400 Kbyte | 9/1 0:00 | 9/1 0:03 |

NETWORK MONITORING CONTROL DEVICE AND MONITORING CONTROL METHOD

CROSS-REFERENCE TO RELATED APPLICATIONS

This application is based upon and claims the benefit of priority from the prior Japanese Patent Application No. 2009-83619 filed on Mar. 30, 2009, the entire contents of which are incorporated herein by reference.

FIELD

The present invention relates to a network monitoring control device and a monitoring control method.

BACKGROUND

To monitor a communication device (e.g., a switch, a router, a base station, or the like) that makes up a network, there are two methods: an out-of-band monitoring method; and an in-band monitoring method. The out-of-band monitoring method is used to monitor the communication device through a monitoring line not including the network as a monitoring target. On the other hand, the in-band monitoring method is used to monitor the communication device through the network as the monitoring target. When the communication device is located at a remote position and there is no out-of-band monitoring line, the in-band monitoring method is used.

To perform in-band monitoring (monitoring operation by the in-band monitoring method) on the communication device, an in-band monitoring VLAN (hereinafter referred to as a monitoring VLAN) is provided in the network. Each communication device is controlled on the monitoring VLAN. The control is performed by a Simple Network Management Protocol (SNMP), a Telecommunication Network (Telnet), a File Transfer Protocol (FTP), or the like.

The monitoring VLAN is made up of a layer-2 network. As for communication from a monitoring control device to the communication device, Quality of Service (QoS) may be set in a router on a route for each protocol type (SNMP, Telnet, or a port number of FTP).

However, priority control information may not be set to the communication (Ethernet (trademark) frame) from the communication device to the monitoring control device, so that the communication is performed with the same priority as other communication.

When connection type file transfer of configuration information or the like of the communication device is performed on the monitoring VLAN, a band of the monitoring VLAN may be occupied.

Japanese Laid-open Patent Publication No. Hei 11-136238 discloses a device that learns traffic characteristics of a signal channel in a packet network and that allocates bands.

SUMMARY

A monitoring control device monitors a communication device connected through a network through a virtual LAN provided on the network. The monitoring control device includes: a bandwidth learning unit which learns a bandwidth between the communication device and the monitoring control device by a first file transfer; and a file transfer management unit which manages whether or not a second file transfer, which passes through at least one section, is able to be performed based on a section bandwidth of the at least one section of the network, the section bandwidth obtained from the bandwidth learned by the bandwidth learning unit.

BRIEF DESCRIPTION OF THE DRAWINGS

FIGS. 1A-1F are block diagrams illustrating a network system according to an embodiment, FIG. 2 is an overview illustrating a communication route on an in-band monitoring VLAN, FIGS. 3A-3C re block diagrams illustrating use band management of file transfer performed by a network system, FIGS. 5A-5D are block diagrams illustrating network topology management by the network system, FIGS. 7A-7F are block diagrams illustrating use band threshold value management of the file transfer by the network system, FIG. 8 is a flowchart illustrating operations of a management controlling device in the band use threshold value management of the file transfer, FIG. 9 is a flowchart illustrating operations of the management controlling device in the use band threshold value management (standby mode) of the file transfer, FIGS. 10A-10F are block diagrams illustrating change management of the network topology by the network system, FIGS. 11A-11F are block diagrams illustrating prediction of a file transfer end time by the network system, FIGS. 13A-13F are block diagrams illustrating scheduling of the file transfer by the network system.

DETAILED DESCRIPTION OF THE EMBODIMENTS

Figure 1C:
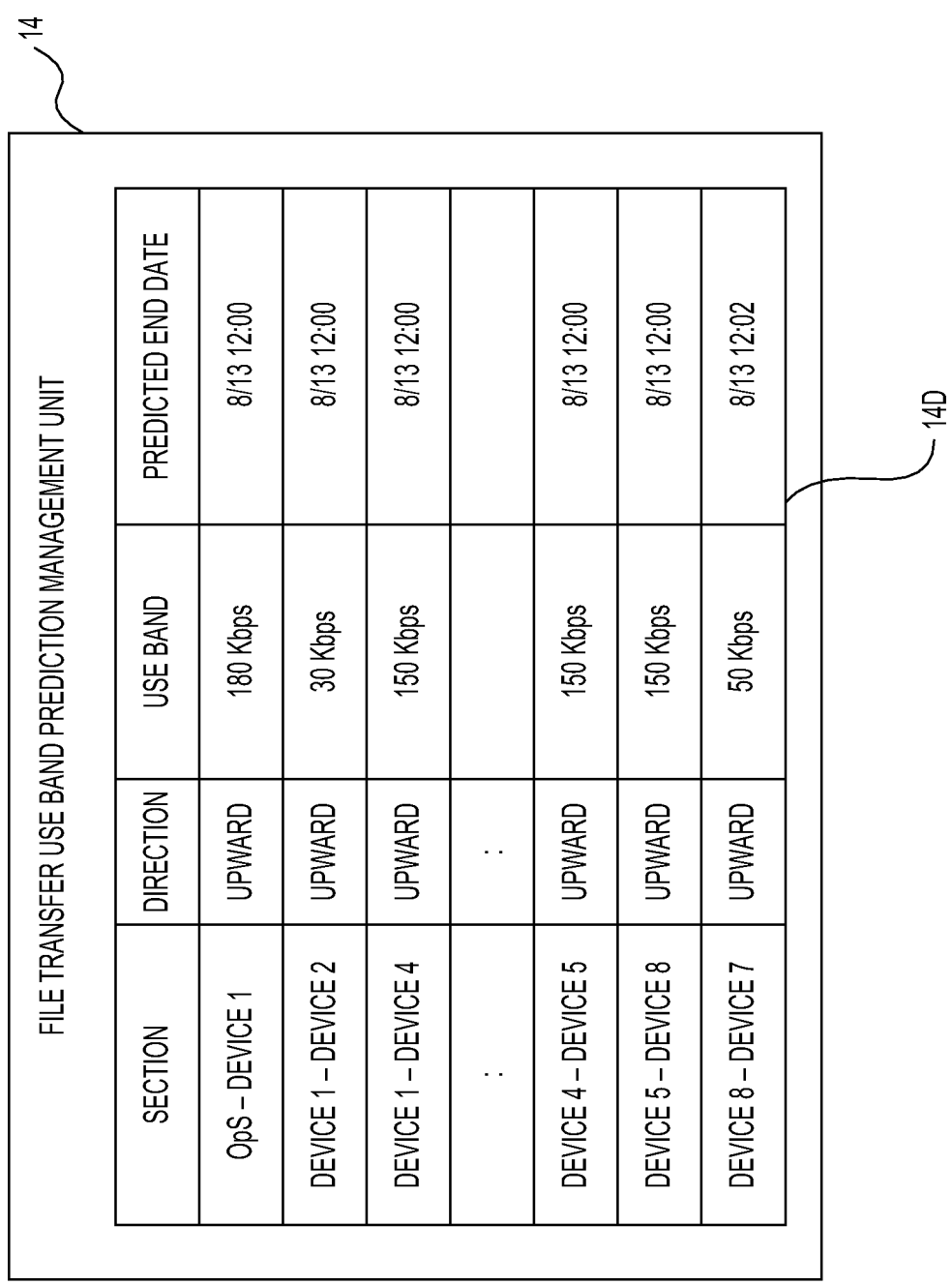
Figure 1D:
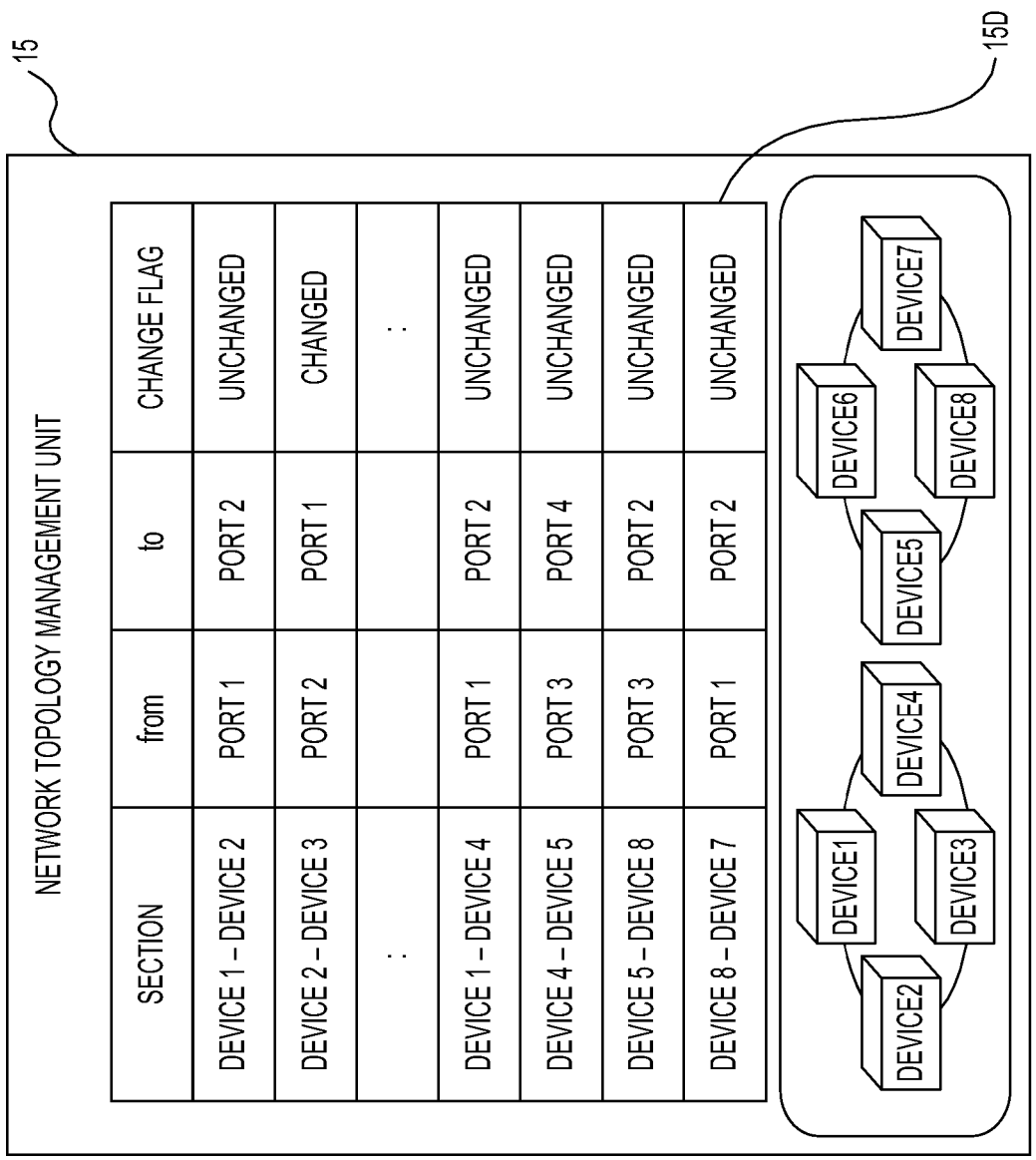

With reference to the diagrams, embodiments will be described in detail. The diagrams have the same numerals for the same component elements or corresponding component elements.

FIGS. 1A-1F are block diagrams illustrating a network system 100 according to an embodiment.

The network system 100 includes communication devices 1 to 8 (devices 1 to 8 illustrated in the diagrams), a monitoring control device 10, and a client terminal 20 according to an embodiment. The component elements are connected to each other through a network as illustrated in FIGS. 1A-1F.

In the network system 100, as illustrated with dotted lines, communication devices 1 to 4 connected in a ring shape and communication devices 5 to 8 connected in a ring shape are bridge-connected between the communication device 4 and the communication device 5, and the communication device 1 and the monitoring control device 10 are connected so that a monitoring Virtual Local Area Network (VLAN) is established.

The communication devices 1 to 8 are, for example, a switch, a router, or a base station. In this example, the communication device 2 has a 1234 kilobyte file 2f. The communication device 7 has a 500 kilobyte file 7f. The communication device 8 has a 400 kilobyte file 8f.

The monitoring control device 10 according to the embodiment includes a file transfer processing unit 11, a file storage unit 12, a file transfer use band learning unit 13, a file transfer use band prediction management unit 14, a network topology management unit 15, a topology use band threshold value management unit 16, a file transfer scheduling unit 17, and a control unit 18.

The file transfer processing unit 11 performs a file transfer among the communication devices 1 to 8 through the monitoring VLAN. For example, as illustrated with arrows in solid lines in the diagrams, the file transfer processing unit 11 receives the file transfer from the file 8f of the communication device 8 and uses a band 100 Kbps.

The file storage unit 12 stores and manages a transmission file and a reception file that are transmitted or received by the file transfer processing unit 11.

The file transfer use band learning unit 13 may learn a use bandwidth at the time of the file transfer based on a transfer time required for the file transfer and a file size of a transferred file, and may manage the use bandwidth as use bandwidth information 13D. This learning may be performed according to an instruction from an operator through the client terminal 20 or may be performed automatically. The automatic learning is performed, for example, in a prescribed period, or when a given event occurs in the network system 100. The use bandwidth (average bandwidth) may be calculated by the following equation.

$$\text{Use bandwidth (Mb/s)} = \text{file size (Mb)}/\text{transfer time (s)} \quad \text{(Equation 1)}$$

The file transfer use band learning unit 13 reads a file size to be file-transferred in advance, predicts the file transfer time based on the use bandwidth included in use bandwidth information 13D, and obtains a predicted file transfer time. The predicted file transfer time may be calculated by the following equation.

$$\text{Predicted file transfer time (s)} = \text{file size (Mb)}/\text{average bandwidth (Mb/s)} \quad \text{(Equation 2)}$$

The use bandwidth information 13D includes a communication device of a communication partner, a direction of the communication (upward or downward), a file size that is file-transferred, a use band, and a transfer time required for the file transfer.

The file transfer use band prediction management unit 14 predicts and manages a bandwidth used for the file transfer based on the use bandwidth and the network topology information learned by the file transfer use band learning unit 13. The prediction management is performed by section unit of the network for each file transfer. The band used for the file transfer in a section may be calculated by the following equation, for example, as a total sum of the use band for each file transfer.

$$\text{File transfer prediction total use band (Mb/s)} = \Sigma(\text{use band (Mb/s) for each file transfer}) \quad \text{(Equation 3)}$$

The file transfer use band prediction management unit 14 manages the bandwidth, which is to be predicted and managed, as bandwidth information 14D. The bandwidth information 14D includes each section of the network, a direction (upward or downward) of the file transfer which passes through the section, a used bandwidth used for the file transfer, and a predicted end date of the file transfer.

The network topology management unit 15 includes network topology information 15D that is managed by one section unit when a file transfer route is changed by increasing or decreasing the communication devices or by protection switching of the monitoring VLAN.

The network topology information 15D includes a change flag indicating a change in each section of the network, ports ("from" and "to") of the communication device, or the network topology. Based on information of the change flag, the file transfer use band learning unit 13 may relearn the use band information if the file transfer route is changed.

The topology use band threshold value management unit 16 accepts a setting of a threshold value of the use band for each section of the network topology and determines whether or not the file transfer is possible so that the use band threshold value does not exceed the above-described file transfer prediction total use band. In each section, the file transfer is performed if the following equation is true and is not performed if the following equation is false.

$$\Sigma(\text{use band (Mb/s) for each file transfer}) + \text{learned file transfer use band} \leq \text{file transfer threshold for each section} \quad \text{(Equation 4)}$$

The topology use band threshold value management unit 16 has a mode in which an error is returned to the operator and a mode that stands by until the use band is within the threshold value in every section. The standby mode may check whether or not the file transfer is possible in every section by the above-described Equation 4 when each file transfer processing is completed.

The topology use band threshold value management unit 16 has threshold value information 16D that includes a direction of the file transfer and a setting threshold value for each section of the network.

The file transfer scheduling unit 17 performs reservation and scheduling of the file transfer. When the operator specifies a plurality of file transfers, the file transfers may be scheduled based on the predicted file transfer end time of each section.

Based on the predicted file transfer end date information, the file transfer scheduling unit 17 obtains a scheduled start date in which Equation 4 is true. Based on the scheduled file transfer start date information and the use band information, the file transfer scheduling unit 17 obtains the predicted end date. Furthermore, the file transfer scheduling unit 17 may hold the use band, the scheduled start date, and the predicted end date by section unit for each file transfer.

The control unit 18 controls each unit of the above-described monitoring control device 10 and executes a request received from the operator through the client terminal 20.

The client terminal 20 is a work station or a personal computer that is used by the operator of the network system 100.

Each unit of the above-described monitoring control device 10 may work in a specific electric circuit. Furthermore, each of the units of the above-described monitoring control device 10 may work as software or firmware that operates a micro processor or a controller as each unit of monitoring control device 10.

Each unit of the above-described monitoring control device 10 may spontaneously perform each operation or may perform each operation according to a control signal from the control unit 18.

FIG. 2 is an overview illustrating a communication route on the in-band monitoring VLAN 30. The in-band monitoring VLAN 30 has, for example, a band of 2000 (Kbps), and a file transfer band 35 is provided therein. The bandwidth of the file transfer band 35 is limited to, for example, a threshold value of 1000 (Kbps).

Since the bandwidth of the file transfer band 35 is limited to the threshold value, a signal 32 such as SNMP Get/Set, SNMP Response, and SNMP Trap may pass through the in-band monitoring VLAN 30 without being influenced by the file transfer.

Since the bandwidth of the file transfer band 35 is limited to the threshold value, no other file transfer may be performed while a file transfer 37 is being performed. This is because the file transfer 37 uses the bandwidth 1000 kbps (=300 kbps+ 500 kbps+200 kbps), and the threshold value 1000 kbps is fully used.

Detailed description will be made of operations of each unit of the monitoring control device 10.

[Use Band Management of File Transfer]

Figure 3B:
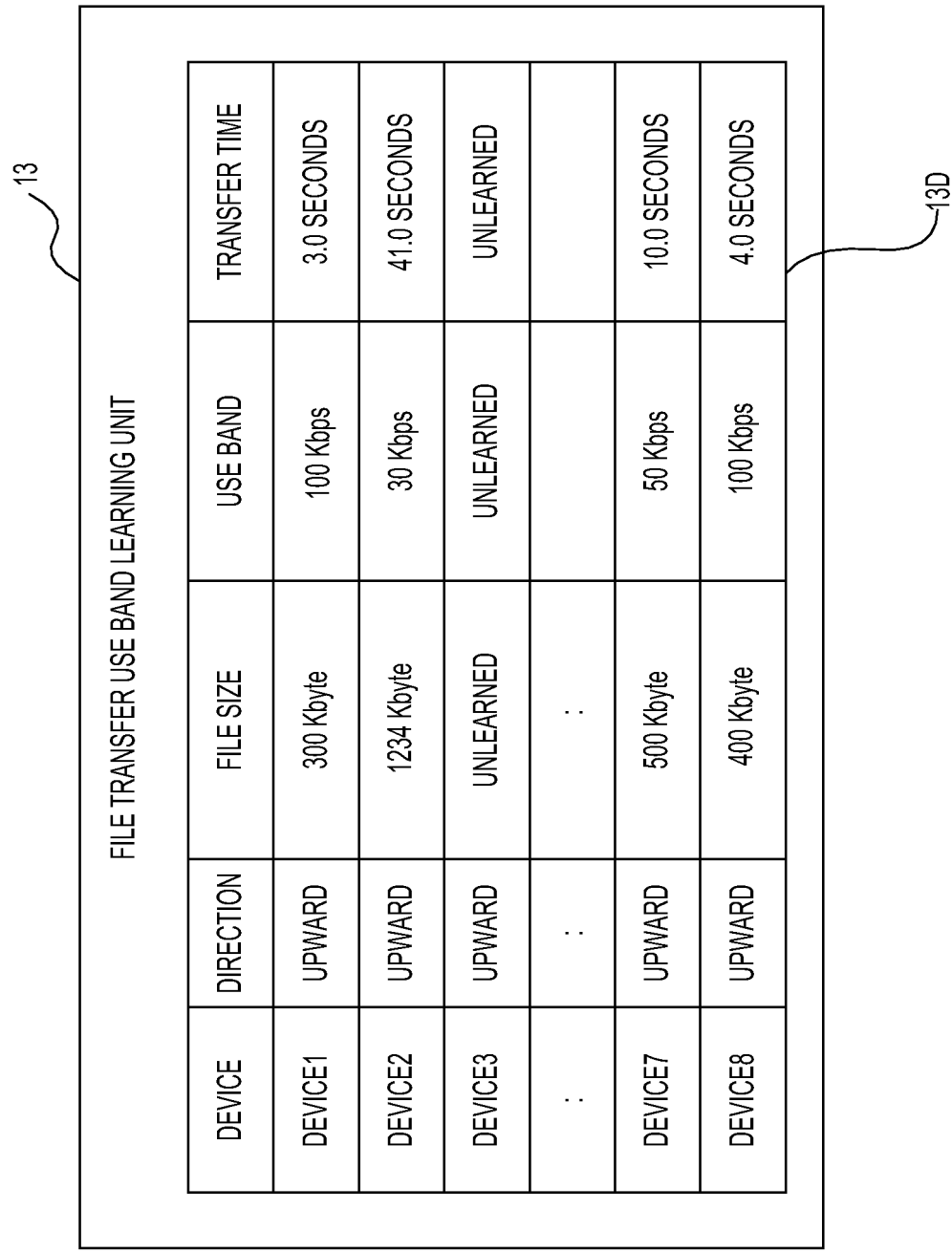
Figure 4:
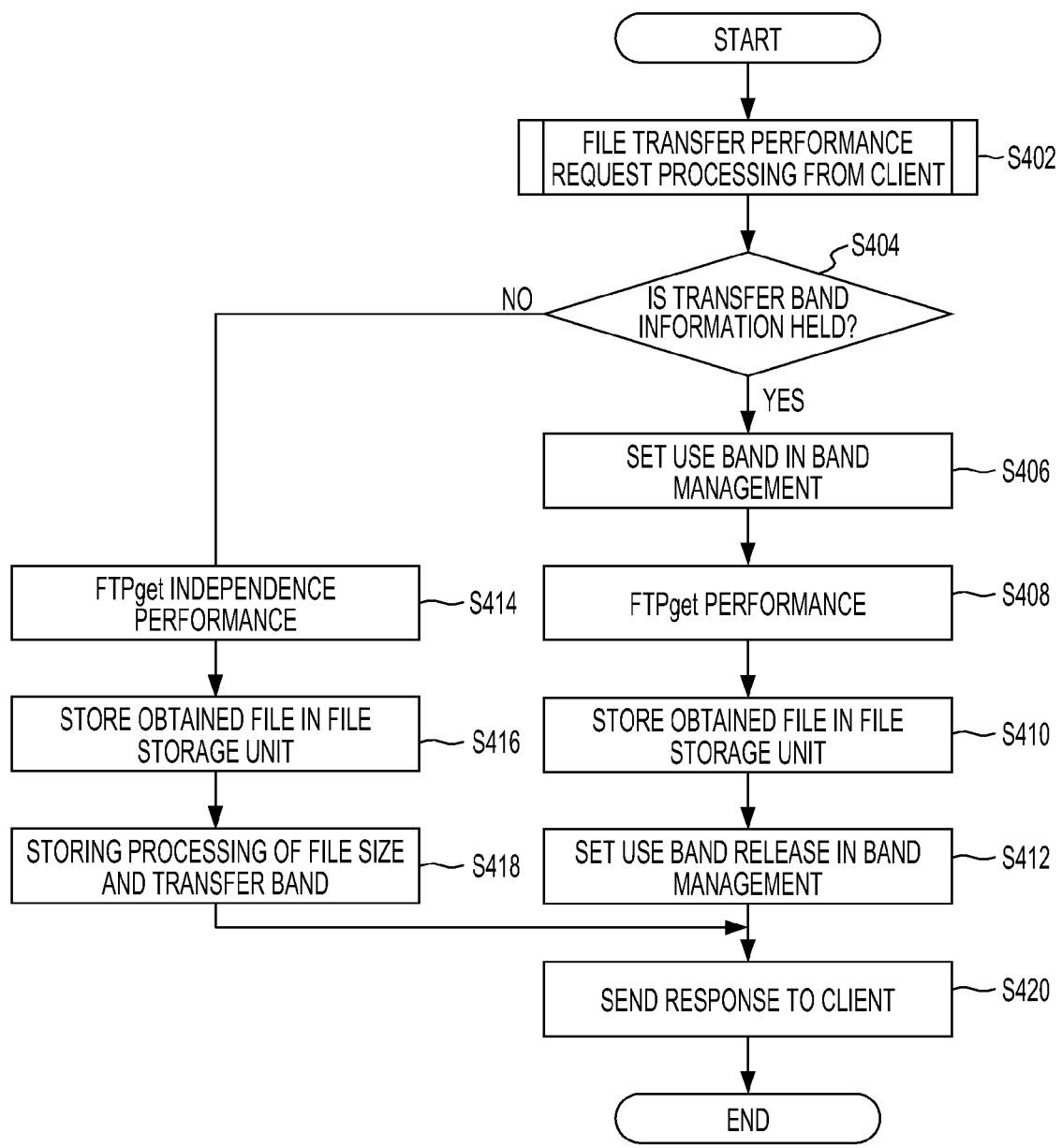
FIG. 4 is a flowchart illustrating operations of a monitoring control device in the use band management of the file transfer.
Figure 5B:
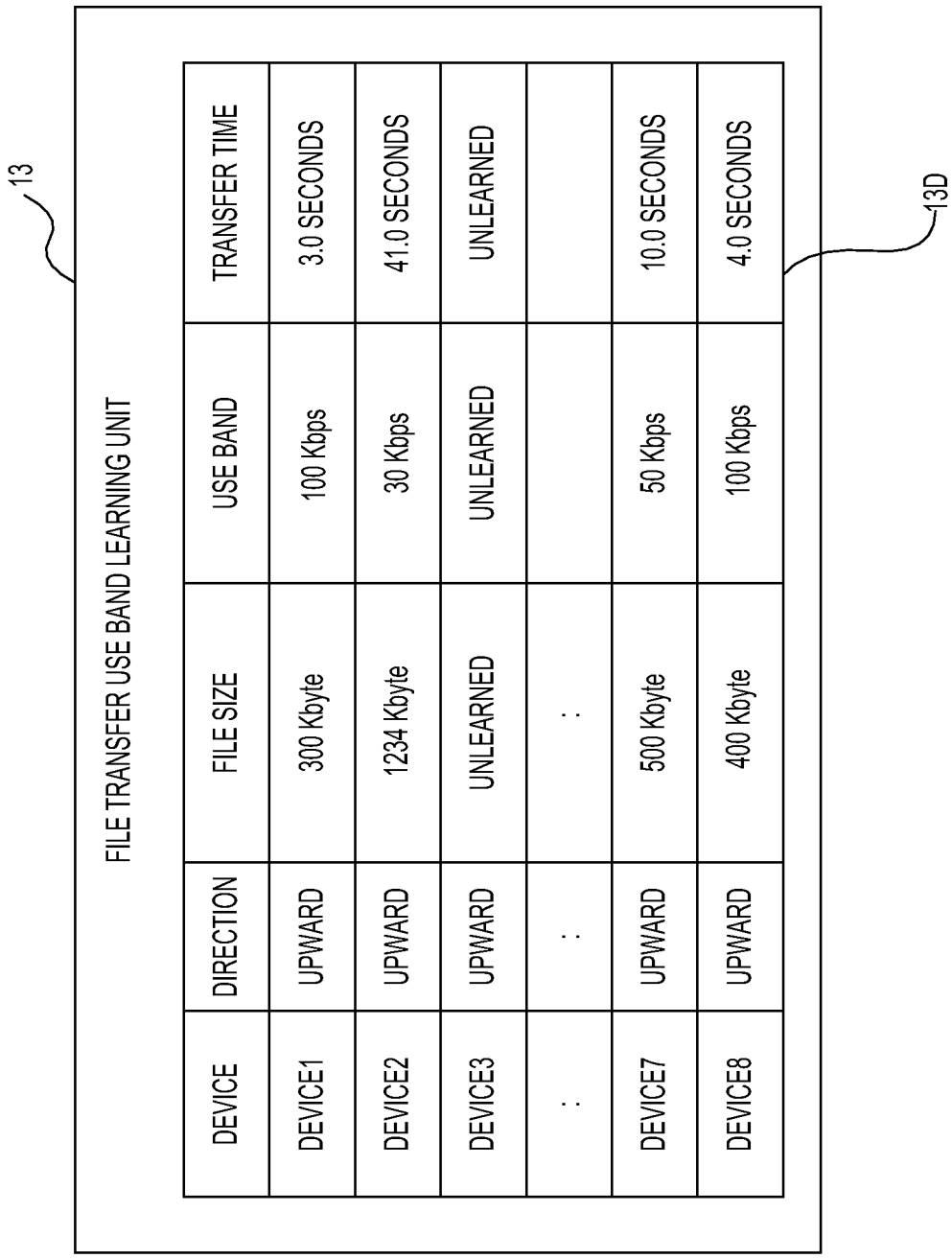
Figure 5D:
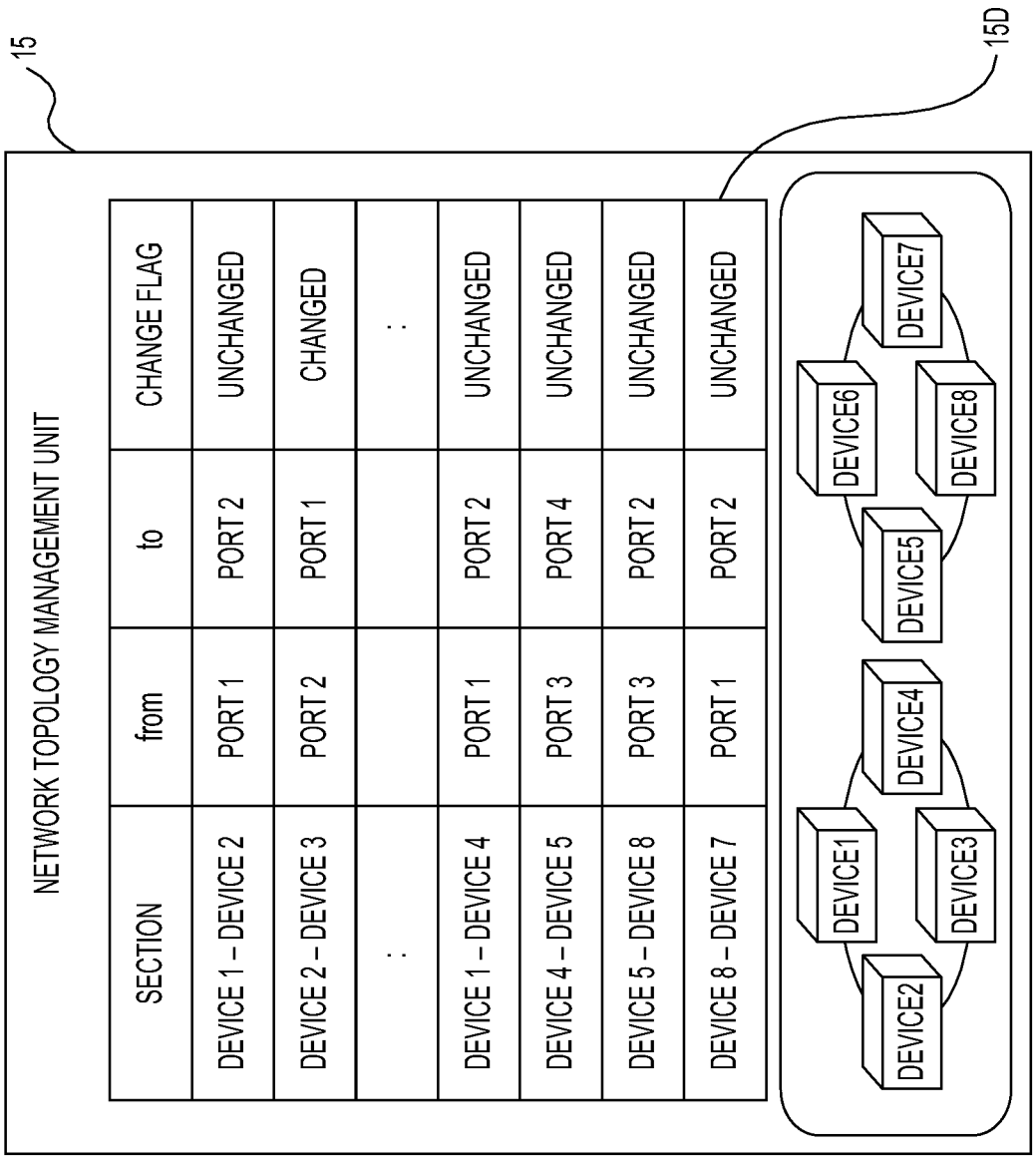

FIGS. 3A-3C are block diagrams illustrating use band management of the file transfer by the network system 100. FIG. 4 is a flowchart illustrating operations of the monitoring control device 10 in the use band management of the file transfer. With reference to FIGS. 3A-3C and FIG. 4, description will be made of the use band management of the file transfer.

According to an operation of the operator of the network system 100, the client terminal 20 transfers a performance request of the file transfer to the monitoring control device 10 (e.g., the control unit 18) (Operation S402 in FIG. 4).

The control unit 18 confirms whether or not the file transfer use band learning unit 13 holds the use band information of the communication device that receives a file transfer instruction in the use bandwidth information 13D (Operation S404).

If the file transfer use band learning unit 13 holds the use band information in the use bandwidth information 13D (YES in Operation S404), the control unit 18 sets the use band information in the file transfer use band prediction management unit 14 (Operation S406).

The control unit 18 makes the file transfer processing unit 11 perform the file transfer processing (performance of FTPget) with respect to the communication device (e.g., the communication device 7) (Operation S408).

After the file transfer is completed, the control unit 18 makes the file transfer processing unit 11 store the obtained file in the file storage unit 12 (Operation S410).

The control unit 18 makes the file transfer use band prediction management unit 14 release the set use band information (Operation S412) and sends a response to the client terminal 20 (Operation S420).

By performing the above-described operations, the file transfer use band prediction management unit 14 may dynamically manage a use band in a transient condition during the file transfer.

On the other hand, when the file transfer use band learning unit 13 does not hold the use band information in the use bandwidth information 13D (NO in Operation S404), the control unit 18 makes the file transfer processing unit 11 independently perform the file transfer processing with the communication device (e.g., the communication device 7) (Operation S404). The word "independently" in this case means that only the file transfer is performed and no other file transfer is performed.

The file transfer processing unit 11 performs the file transfer and stores the obtained file in the file storage unit 12 (Operation S416).

Next, the file transfer use band learning unit 13 obtains the use band based on the obtained file size and the transfer time required to obtain the file size, and then updates the use bandwidth information 13D (Operation S418). The file transfer use band learning unit 13 calculates the use band based on the above-described Equation 1.

The control unit 18 sends a response to the client terminal 20 (Operation S420). The operation of the monitoring control device 10 is ended.

[Network Topology Management]

Figure 6:
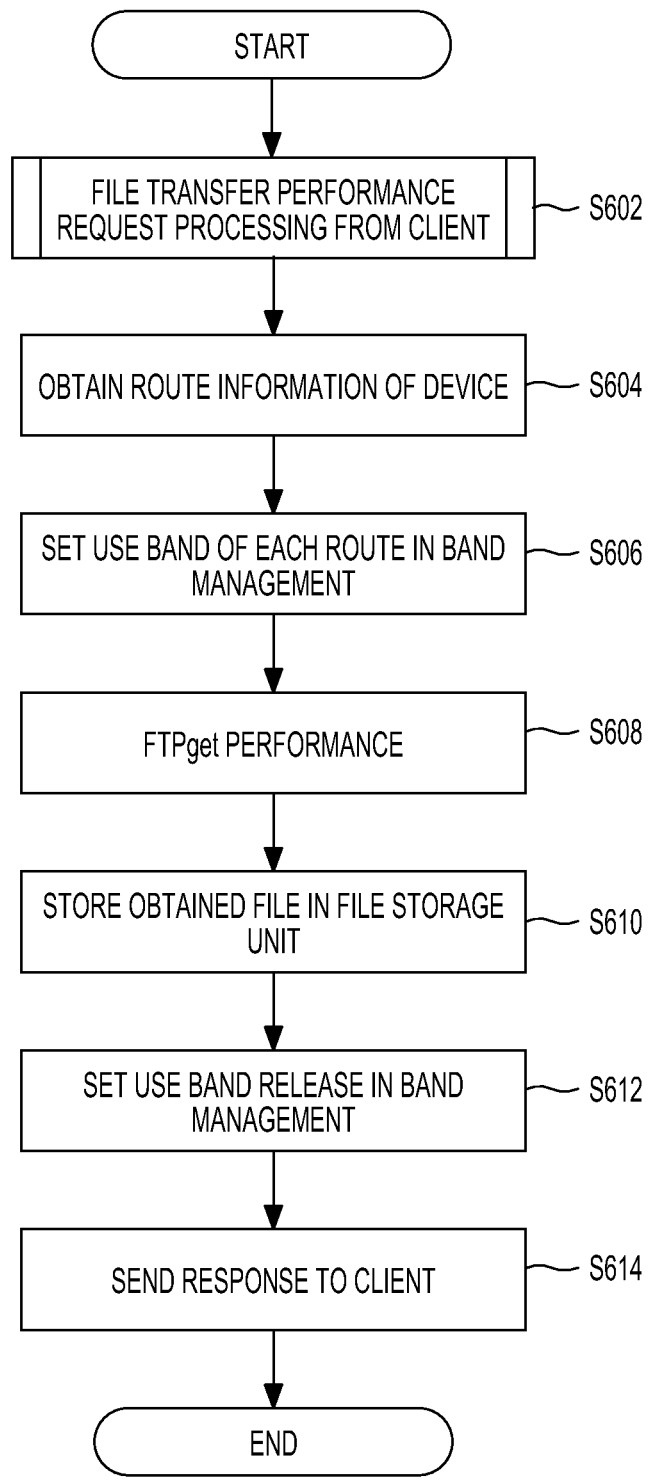
FIG. 6 is a flowchart illustrating operations of the monitoring control device in the network topology management.
Figure 7A:
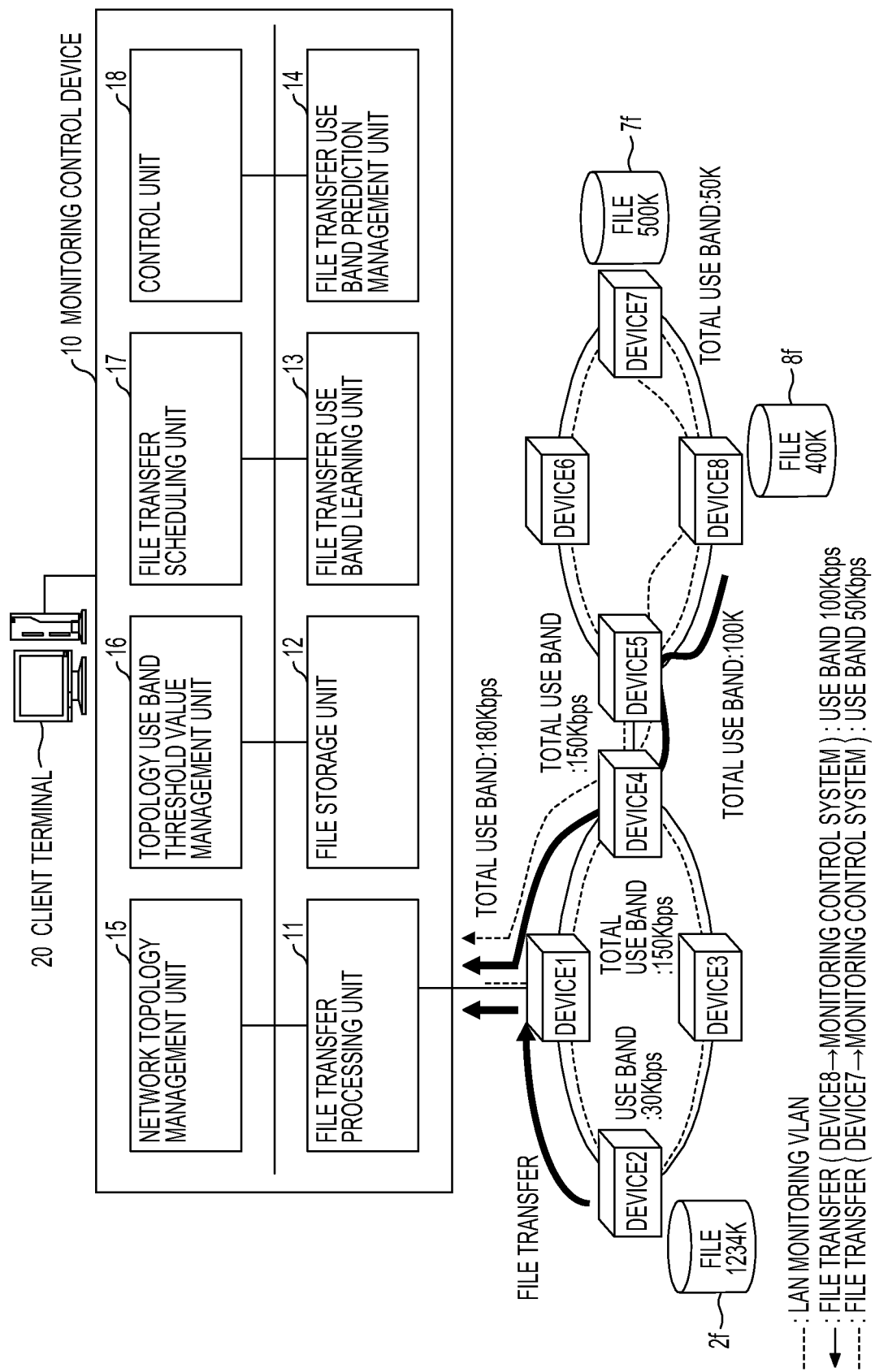
Figure 7B:
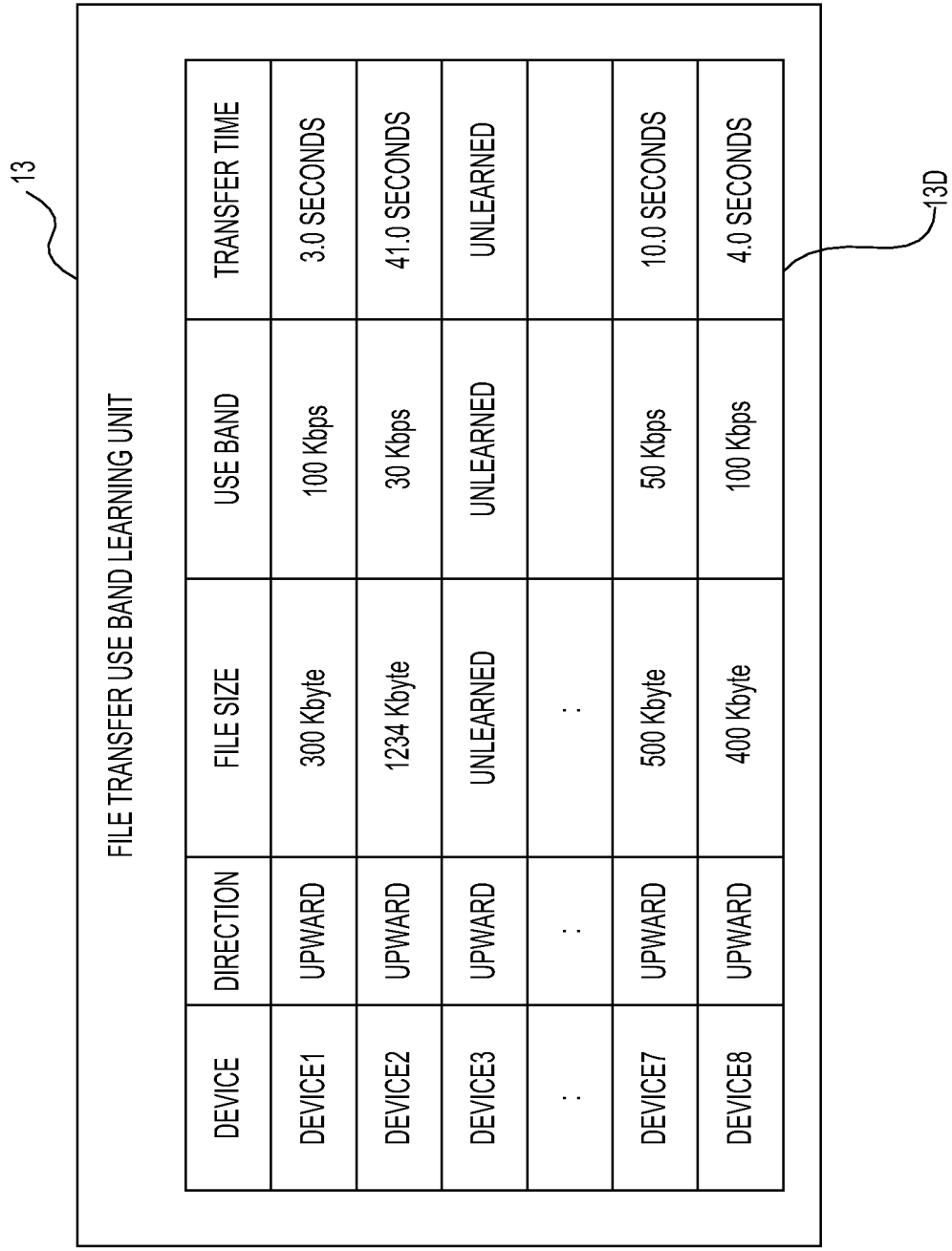
Figure 7D:
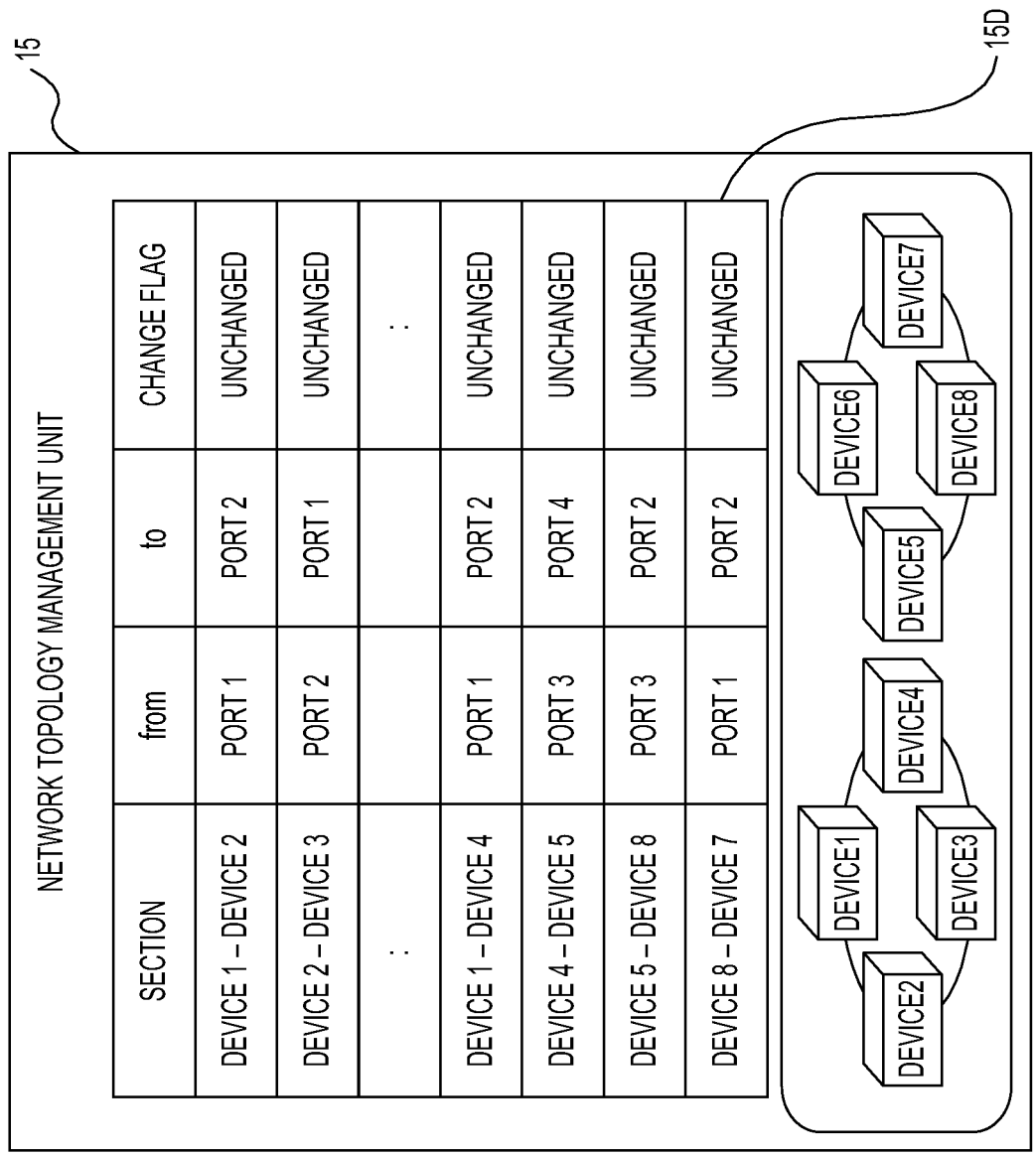
Figure 10A:
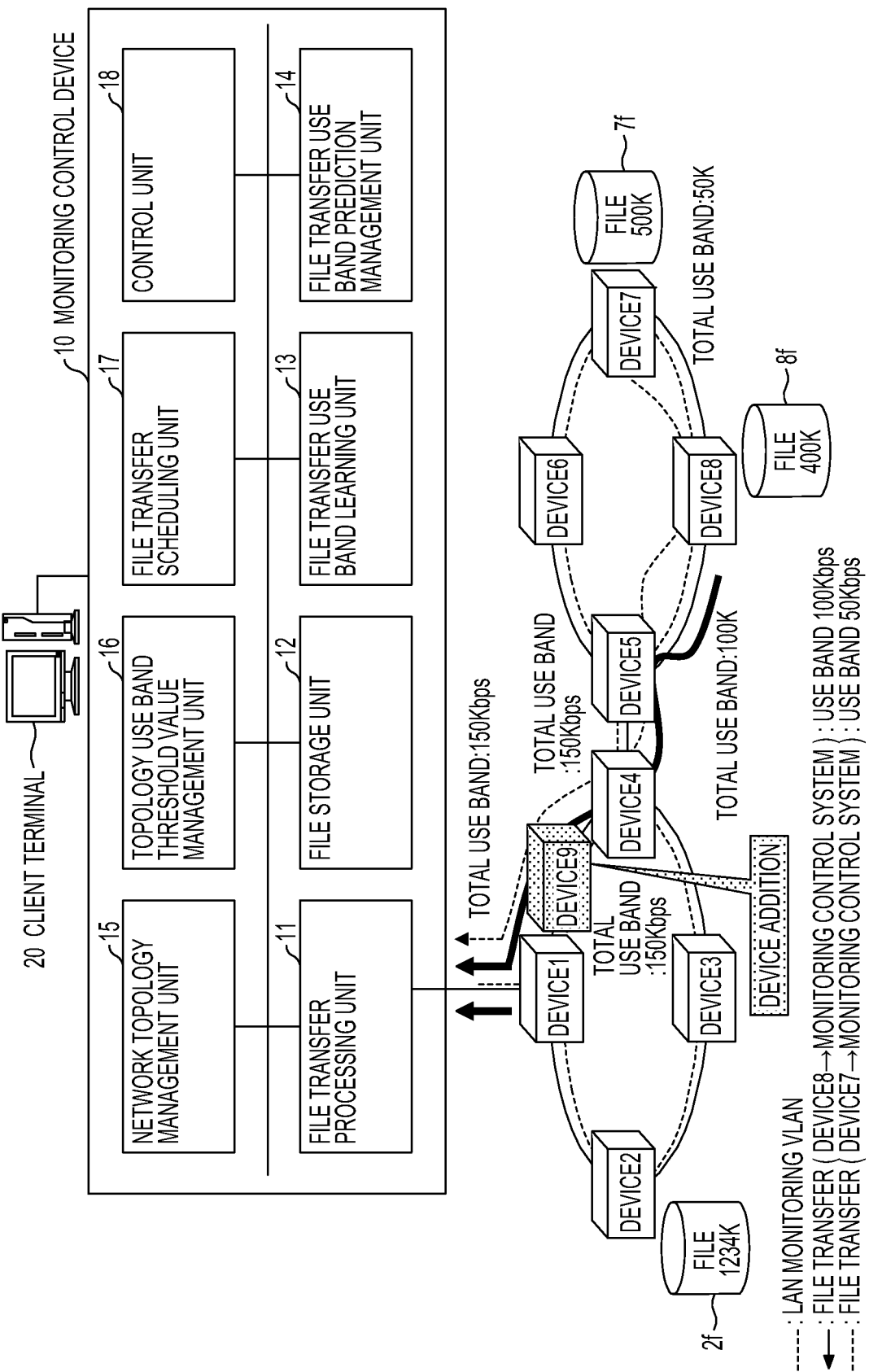
Figure 10D:
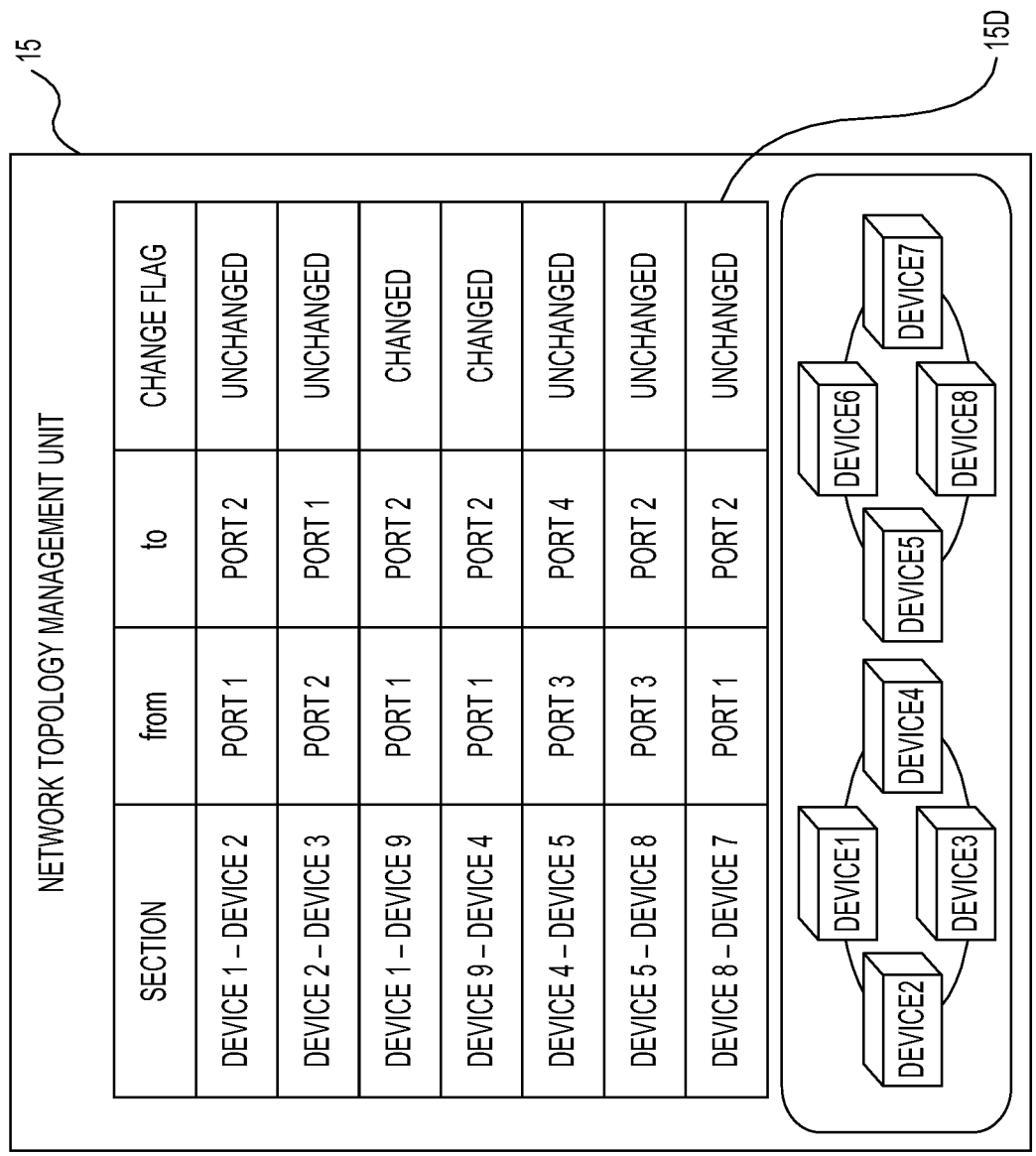
Figure 11E:
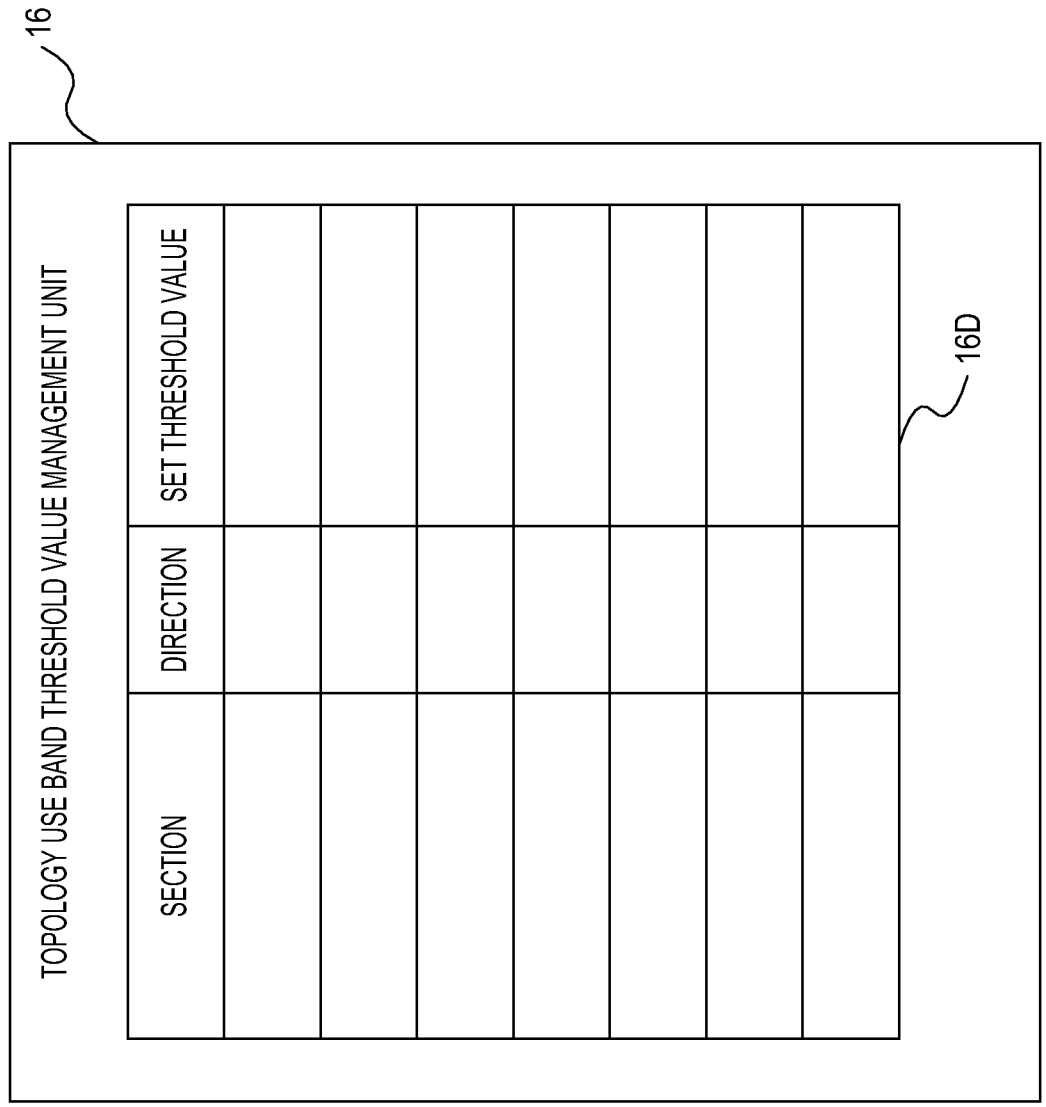
Figure 11F:
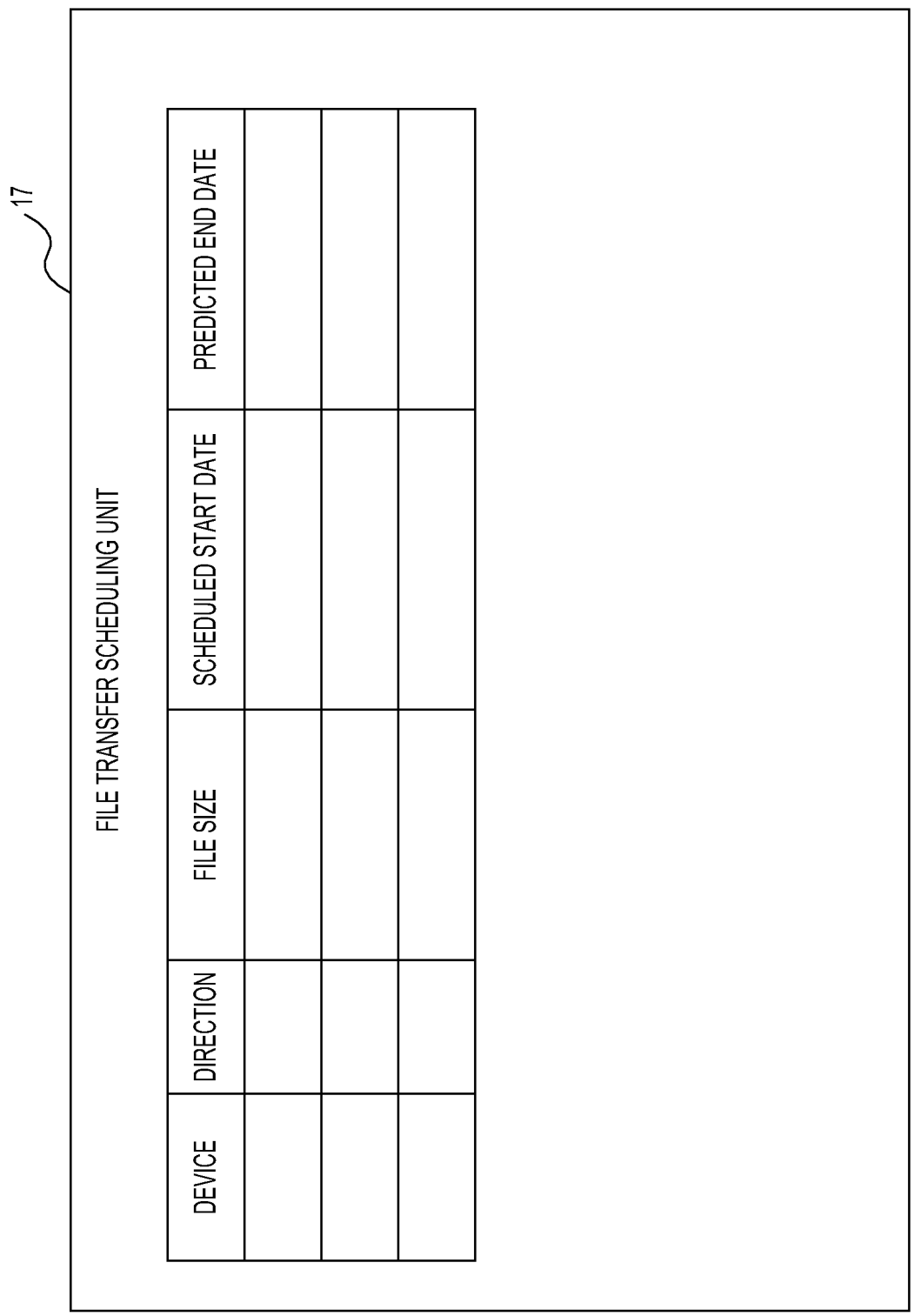

FIGS. 5A-5D are block diagrams illustrating network topology management by the network system 100. FIG. 6 is a flowchart illustrating operations of the monitoring control device 10 in the network topology management. With reference to FIGS. 5A-5D and FIG. 6, description will be made of the network topology management.

In the monitoring control device 10, the topology information (connection information of the communication devices) of the communication devices 1 to 8 included in the network topology illustrated in FIGS. 5A-5D is managed by the network topology management unit 15.

The network topology management unit 15 manages connection information as a "from" port and a "to" port for each section (a section between a communication device and another communication device).

According to the present embodiment, the communication devices 1 to 8 make up a ring topology. In other embodiments, the communication devices 1 to 8 may make up a linear-type topology, a star-type topology, or a mesh-type topology.

Since the monitoring VLAN is formed with a layer 2 (a data link layer), there is a single file transfer route (no loop generated).

When receiving a file transfer request from the client terminal 20 (Operation S602 in FIG. 6), the control unit 18 sends the network topology (route information) of the communication devices 1 to 8 to the file transfer use band prediction management unit 14 (Operation S604). The control unit 18 sets the use band information learned by the file transfer use band learning unit 13 in the file transfer use band prediction management unit 14.

The file transfer use band prediction management unit 14 obtains file transfer route information from the network topology management unit 15 to the communication device (e.g., the communication device 7) (Operation S604) and sets the use band information for each route (section).

The control unit 18 sets the use band information in the file transfer use band prediction management unit 14 (Operation S606).

The control unit 18 makes the file transfer processing unit 11 perform the file transfer processing (FTPget performance) with respect to the communication device (e.g., the communication device 7) (Operation S608).

After the file transfer is performed, the control unit 18 makes the file transfer processing unit 11 store the obtained file in the file storage unit 12 (Operation S610).

The control unit 18 makes the file transfer use band prediction management unit 14 release the set use band information (Operation S612) and sends a response to the client terminal 20 (Operation S620).

[Use Band Threshold Value Management of File Transfer]

FIGS. 7A-7F are block diagrams illustrating use band threshold value management of the file transfer by the network system 100. FIG. 8 is a flowchart illustrating operations of the monitoring control device 10 in the use band threshold value management of the file transfer. With reference to FIGS. 7A-7F and FIG. 8, description will be made of the use band management of the file transfer.

The operator of the monitoring control device 10 may set a threshold value of the file transfer for each section (route) of the network topology through the client terminal 20 by the topology use band threshold value management unit 16. As illustrated in the topology use band threshold value management unit 16 in FIGS. 7A-7F, it is assumed that the threshold value for each route (section) is set.

When receiving the file transfer request from the client terminal 20 (Operation S802 in FIG. 8), the control unit 18 inquires the network topology management unit 15 whether or not the network topology information is changed (Operation S804). If the network topology information is changed (YES in Operation S804), the process goes to Operation S828.

If the network topology information is not changed (NO in Operation S804), the control unit 18 inquires whether or not the file transfer use band learning unit 13 holds transfer band information corresponding to the file transfer required by the client terminal 20 (Operation S806). If the file transfer use band learning unit 13 does not hold transfer band information corresponding to the file transfer required by the client terminal 20 (NO in Operation S806), the process goes to Operation S828.

If the file transfer use band learning unit 13 does hold transfer band information corresponding to the file transfer required by the client terminal 20 (YES in Operation S806), the process goes to Operation S808.

The control unit 18 makes the file transfer processing unit 11 obtain a file size of the file required to be file-transferred before the file transfer (Operation S808) is actually performed and transmits the file size to the file transfer use band prediction management unit 14.

Based on the obtained file size and the transfer band information held by the file transfer use band learning unit 13, the file transfer use band prediction management unit 14 calculates a use band and a transfer time by the file transfer (Operation S810).

From the network topology management unit 15, the file transfer use band prediction management unit 14 obtains information of a route up to a communication device (Operation S812). With reference to FIGS. 10A-10F, detailed description will be made of obtainment of the route information by the network topology management unit 15. As for all the sections in the transfer route (loop of Operation S814 to Operation S181), the file transfer use band prediction management unit 14 determines whether or not a bandwidth required for the file transfer is within a threshold value that is set in the topology use band threshold value management unit 16 (Operation S816). In all the sections in the transfer route, if the bandwidth required for the file transfer is not within the threshold value that is set in the topology use band threshold value management unit 16 (NO in Operation S816), the process goes to Operation S834.

If the file transfer use band prediction management unit 14 determines that the bandwidth required for the file transfer is within the threshold value that is set in the topology use band threshold value management unit 16, the file transfer use band prediction management unit 14 sets a use band and a predicted end time (Operation S8), and notifies the control unit 18 of the determination.

The control unit 18 makes the file transfer processing unit 11 execute a FTPget command (Operation S822) and stores the obtained file in the file storage unit 12 (Operation S824). The control unit 18 releases the use band that is set in the file transfer use band prediction management unit 14 (Operation S826).

The control unit 18 notifies the client terminal 20 that the file transfer is completed (Operation S834).

As for any of the sections, if the bandwidth required for the file transfer is not within the threshold value that is set in the topology use band threshold value management unit 16 (NO in Operation S816), the file transfer use band prediction management unit 14 notifies the control unit 18 of the determination.

According to the notice, the control unit 18 sends, to the client terminal 20, an error response indicating that the bandwidth required for the file transfer exceeds the threshold value (Operation S834).

If the network topology information is changed (YES in Operation S804) or if the file transfer use band learning unit 13 holds the transfer band information (YES in Operation S806), the control unit 18 makes the file transfer processing unit 11 execute the FTPget command independently (Operation S828). The control unit 18 stores the obtained file in the file storage unit 12 (Operation S830). Furthermore, the control unit 18 makes the file transfer use band learning unit 13 learn the file size and the transfer band (Operation S832) and notifies the client terminal 20 that the file transfer is completed (Operation S834).

As described above, the monitoring control device 10, which monitors the communication devices 1 to 8 connected through the network through a virtual LAN provided on the network, includes the file transfer use band learning unit 13 that learns a bandwidth between the communication devices 1 to 8 and the monitoring control device 10 by the first file transfer. The monitoring control device 10 further includes the file transfer use band prediction management unit 14 that manages whether or not the second file transfer, which passes through the section, may be performed based on a section bandwidth of at least one of the sections of the network obtained by the bandwidth learned by the file transfer use band learning unit 13.

A method according to the embodiment in which the communication devices 1 to 8 connected through the network are monitored through the virtual LAN provided on the network includes a bandwidth learning stage for learning a bandwidth between the communication devices 1 to 8 by the first file transfer. Based on the section bandwidth of at least one section of the network obtained based on the bandwidth learned in the bandwidth learning stage, the above-described method includes a file transfer management stage (e.g., Operation S814 to S826) for managing whether or not the second file transfer, which passes through the section, may be performed.

[Use Band Threshold Value Management of File Transfer (Standby Mode)]

FIG. 9 is a flowchart illustrating operations of the monitoring control device 10 in the use band threshold value management (standby mode) of the file transfer. With reference to FIGS. 7A-7F and FIG. 9, description will be made of the use band of the file transfer.

In the file transfer management of the file transfer described with reference to FIGS. 7A-7F and FIG. 8, if the bandwidth required for the file transfer is not within the threshold value in Operation S816, an error response is sent to the client terminal 20 in Operation S834.

As illustrated in FIG. 9, when the monitoring control device 10 is in the standby mode, the standby processing is started if the bandwidth required for the file transfer is not within the threshold value in any of the sections (Operation S902).

In the standby processing, when receiving a notice (FTP end notice or the like) indicating that the other file transfer that is being performed is completed, the processing is restarted and goes back to Operation S814, and the threshold value determining processing is restarted. Other operations are the same as those in FIG. 8.

[Change Management of Network Topology]

FIGS. 10A-10F are block diagrams illustrating change management of the network topology by the network system 100. With reference to FIGS. 10A-10F, description will be made of the change management of the network topology.

When a communication device 9 is added between the communication device 1 and the communication device 4 in the network system 100, the network topology management unit 15 of the monitoring control device 10 detects the communication device 9 and updates the network topology information. New sections "Communication device 1 to Communication device 9" and "Communication device 9 to Communication device 4" are added to the network topology information, and the corresponding change flag is set to "Changed."

When receiving the file transfer request from the client terminal 20, the control unit 18 checks with the network topology management unit 15 for the change flag of the section information. If the section information is changed on the file transfer route up to the communication device (e.g., the communication device 7) as a partner of the file transfer (in this case, the communication device 9 is added between the communication device 1 and the communication device 4), the file transfer processing with respect to the communication device (the communication device 7) as the partner of the file transfer is performed independently. Based on the file size and the transfer time obtained after the file transfer, the use band is calculated and the bandwidth information is updated.

[Prediction of File Transfer End Time]

Figure 12:
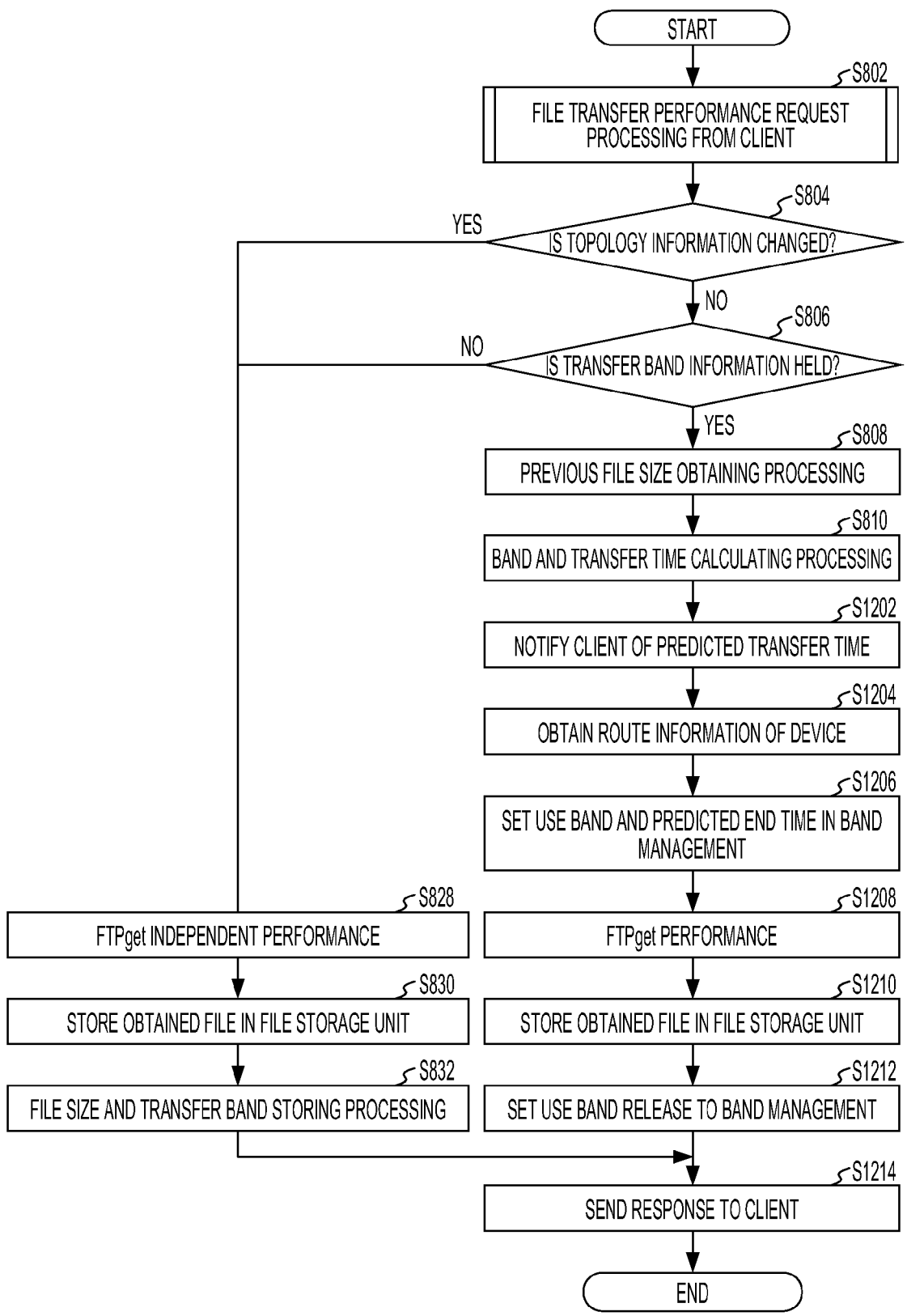
FIG. 12 is a flowchart illustrating operations of the management controlling device in prediction of the file transfer end time.
Figure 13D:
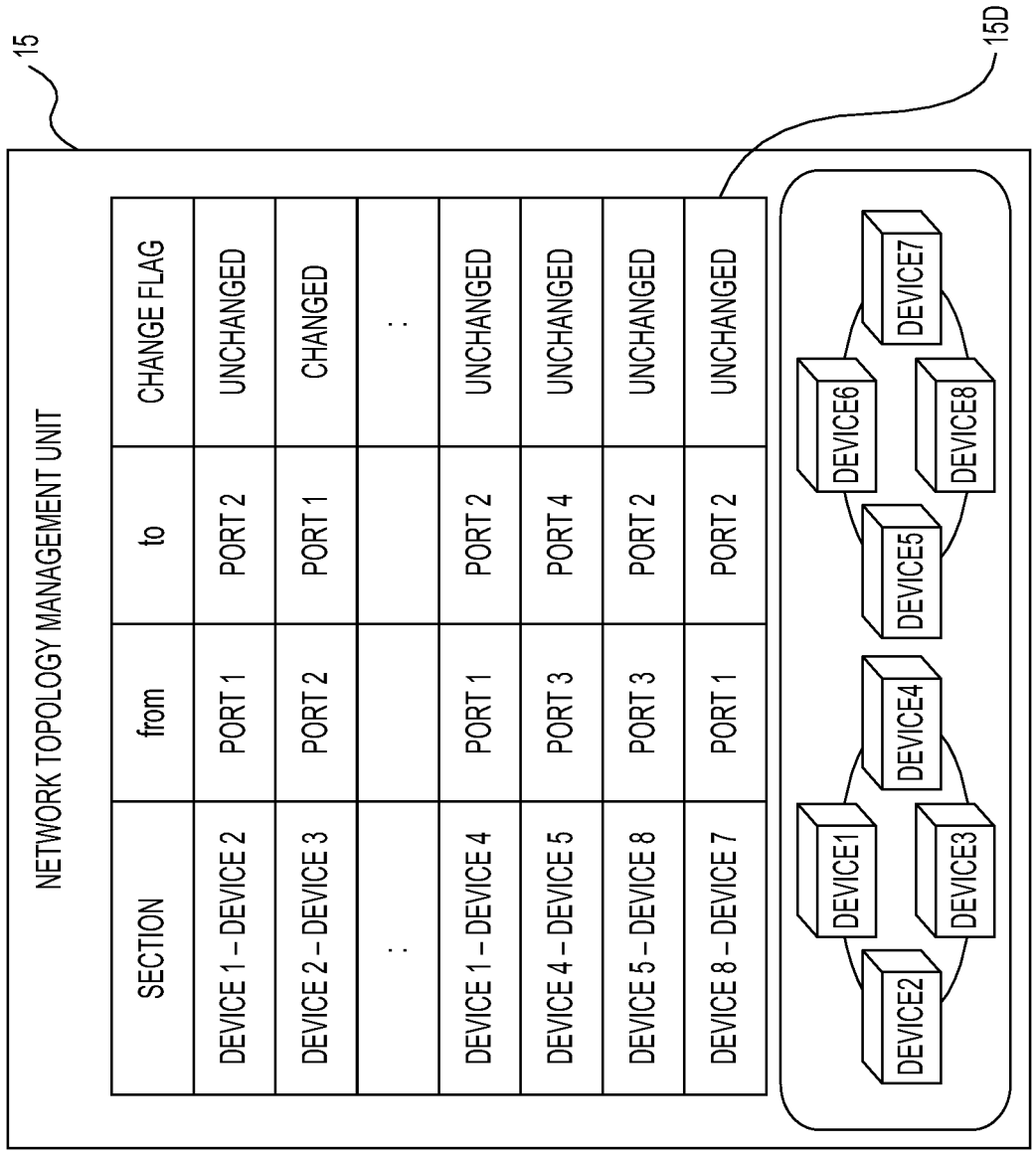

FIGS. 11A-11F are a block diagrams illustrating prediction of the file transfer end time by the network system 100. FIG. 12 is a flowchart illustrating operations of the monitoring control device 10 in the prediction of the file transfer end time. With reference to FIGS. 11A-11F and FIG. 12, description will be made of the prediction of the file transfer end time.

When receiving the file transfer request from the client terminal 20, the monitoring control device 10 (the control unit 18 therein) may predict the file transfer end time by previously obtaining the size of the file to be file-transferred from the communication device.

The predicted file transfer time may be calculated by the above-described Equation 2.

The file transfer use band prediction management unit 14 obtains use band information in the file transfer and the predicted file transfer time for each route (section) unit. The file transfer use band prediction management unit 14 notifies the client terminal 20 of the predicted end time.

In FIG. 12, Operations from S802 to S810 and Operations from S828 to S832 are the same as in FIG. 8.

After Operation S810, the file transfer use band prediction management unit 14 notifies the client terminal 20 of the predicted file transfer time (Operation S1202).

The file transfer use band prediction management unit 14 obtains route information from the network topology management unit 15 to the communication device (Operation S1204).

The file transfer use band prediction management unit 14 sets the use band and the predicted end time (Operation S1206) and notifies the control unit 18 of the use band and the predicted end time.

The control unit 18 makes the file transfer processing unit 11 execute the FTPget command (Operation S1208) and stores the obtained file in the file storage unit 12 (Operation S1210). The control unit 18 further releases the use band that is set in the file transfer use band prediction management unit 14 (Operation S1212).

The control unit 18 notifies the client terminal 20 that the file transfer is completed (Operation S1214).

[File Transfer Scheduling]

Figure 14:
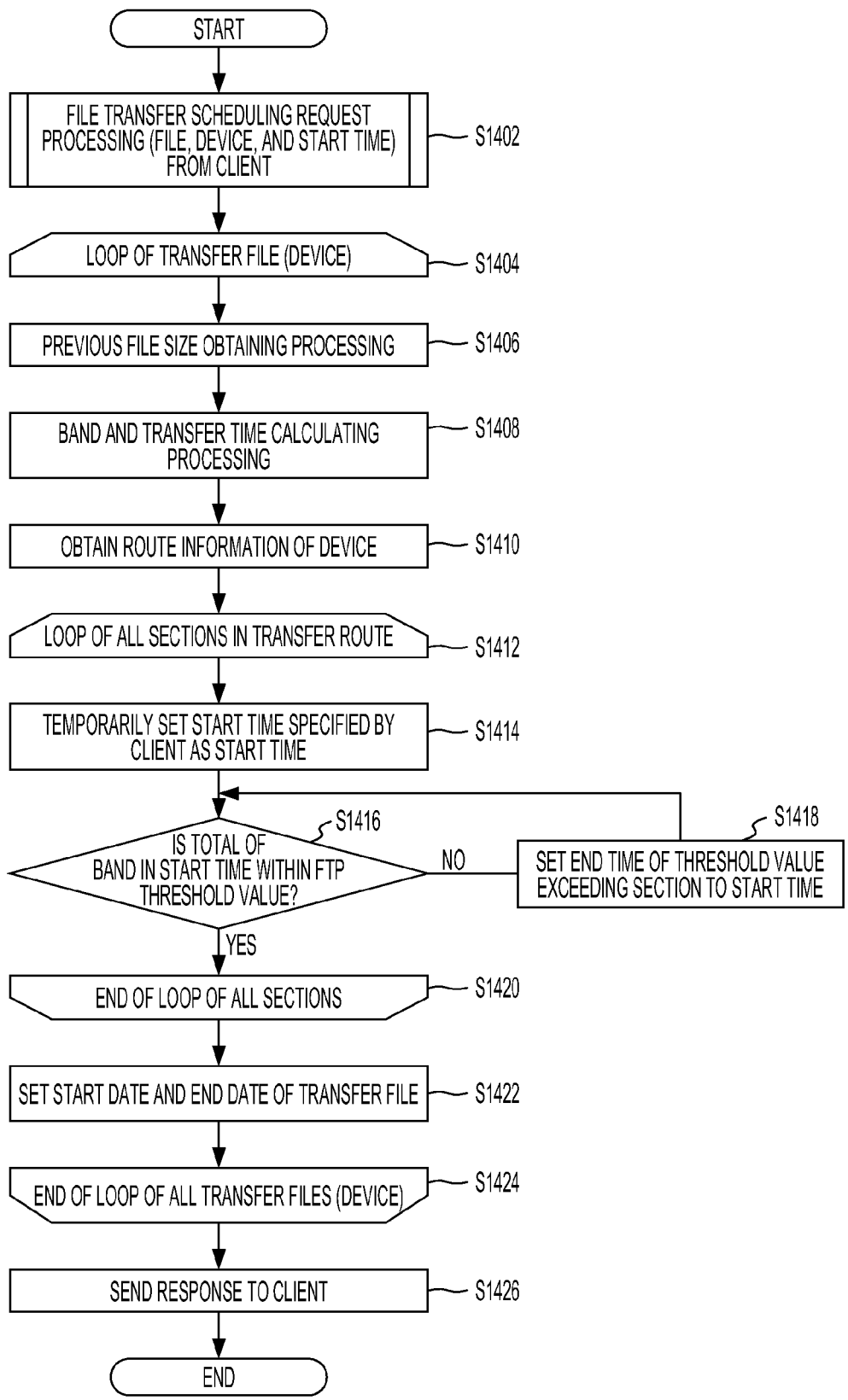
FIG. 14 is a flowchart illustrating operations of the management controlling device in the scheduling of the file transfer.

FIGS. 13A-13F are block diagrams illustrating scheduling of the file transfer by the network system 100. FIG. 14 is a flowchart illustrating operation of the monitoring control device 10 in the scheduling of the file transfer. With reference to FIGS. 13A-13F and FIG. 14, description will be made of the scheduling of the file transfer.

The operator of the monitoring control device 10 may specify performance reservation of a plurality of file transfers through the client terminal 20 and may set, with respect to the monitoring control device 10, the information of the communication device and the file on which the file transfer is performed and a schedule start time (Operation S1402).

The file transfer scheduling unit 17 of the monitoring control device 10 performs the following operation for each file (communication device) specified by the operator (Loop of Operation S1404 to Operation S1424).

Before the file transfer is performed, the file size is obtained (Operation S1406). The file size may be obtained by, for example, the file transfer processing unit 11.

Next, the bandwidth and the transfer time for the file transfer are calculated (Operation S1408). The bandwidth and the transfer time may be calculated by the file transfer scheduling unit 17 or by the file transfer use band prediction management unit 14, for example.

The file transfer scheduling unit 17 obtains file transfer route information up to the communication device (e.g., the communication device 7) from the network topology management unit 15 (Operation S1410).

The following operation is performed on all the sections in the transfer route (Loop of Operation S1412 to Operation S1420).

The start time specified by the client terminal 20 is temporarily set as the start time of the file transfer (Operation S1414).

Between the start time and the end time of the file transfer, whether the total of the sum of the bandwidth of the scheduled file transfer and the sum of the bandwidth of a new file transfer is within the threshold value specified by the topology use band threshold value management unit 16 or not is determined (Operation S1416). Determination of the threshold value may be performed by the above-described Equation 4.

If the total is within the threshold value (YES in Operation S1416), the start dates and the end dates of the file transfers are set (Operation S1422).

If the total is not within the threshold value (NO in Operation S1416), the end time of the other file transfer processing of the same section is set to the start time of the new file transfer (Operation S1418), and then the determination of the threshold value is performed again (Operation S1416).

Then the result of the scheduling is sent to the operator (Operation S1426).

Although the embodiments of the present invention have been described in detail, it should be understood that the various changes, substitutions, and alterations could be made hereto without departing from the spirit and scope of the invention.

As described above, according to the present invention, the band of the monitoring VLAN may not be occupied even if the configuration information of the communication device is file-transferred on the monitoring VLAN. This may prevent Trap and Get/Set response by SNMP from being discarded even during the file transfer.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A monitoring control device which monitors communication devices through a virtual LAN provided on a network, the communication devices are connected to one another through the network, the monitoring control device comprising:
   a bandwidth learning unit which learns a first bandwidth of each of first transfer routes between the monitoring control device and at least one first communication device by using at least one Ethernet frame when a first file transfer is performed over each of the first transfer routes; and
   a file transfer management unit which manages whether a second file transfer over a section included in a second transfer route between the monitoring control device and a second communication device is able to be performed based on a second bandwidth of the section, the section being a path directly connecting adjacent devices in the network, where a file transfer time of the second bandwidth is calculated based on the first bandwidth of each of the first transfer routes including the section.

2. The monitoring control device according to claim 1, comprising a network topology information management unit which manages network topology information of the network, and
   wherein the file transfer management unit obtains the second bandwidth based on the network topology information managed by the network topology management unit.

3. The monitoring control device according to claim 2, wherein the bandwidth learning unit relearns the first bandwidth of each of the first transfer routes when the network topology information, which is managed by the network topology management unit, is changed on the second transfer route.

4. The monitoring control device according to claim 1, wherein, the file transfer management unit permits the second file transfer when the second file transfer is able to be performed in all of the sections included in the second transfer route.

5. The monitoring control device according to claim 1, comprising:
   a threshold value management unit which manages a threshold value of the second bandwidth, and
   wherein the file transfer management unit manages whether or not the second file transfer is able to be performed based on the threshold value managed by the threshold value management unit.

6. The monitoring control device according to claim 1, comprising a file transfer scheduling unit which schedules a third file transfer, which passes through the section, based on the second bandwidth.

7. A monitoring method executed by a monitoring control device to monitor a plurality of communication devices, which are connected to a network, through a virtual LAN provided on the network, the monitoring method comprising:
   learning a first bandwidth of each of first transfer routes between the monitoring control device and first communication devices by using at least one Ethernet frame when a first file transfer is performed over each of the first transfer routes; and
   managing whether a second file transfer over a section included in a second transfer route between the monitoring control device and a second communication device is able to be performed based on a second bandwidth of the section of the network, the section being a path directly connecting adjacent devices in the network, where a file transfer time of the second bandwidth is calculated based on the first bandwidth of each of the first transfer routes including the section.

8. A non-transitory computer readable medium executing a process on a processor, the process comprising:
   managing whether a file transfer over a section included in a second transfer route is able to be performed based on a second bandwidth of the section, and
   wherein the section is a path directly connecting adjacent devices in a VLAN provided on a network, and a file transfer time of the second bandwidth is calculated based on a first bandwidth of each of first transfer routes including the section, and
   wherein the first bandwidth of each of first transfer routes between a monitoring control device and at least one communication device is obtained using at least one Ethernet frame when a first file transfer is performed over each of the first transfer routes.

9. The monitoring control device according to claim 1, the bandwidths are learned based on a transfer time and a file size of a file transfer.

10. The monitoring control device according to claim 2, wherein the topology management unit includes an indicator of a change in each section of the network.

* * * * *